(12) United States Patent
Kasagi et al.

(10) Patent No.: US 11,475,292 B2
(45) Date of Patent: Oct. 18, 2022

(54) INFORMATION PROCESSING APPARATUS AND INFORMATION PROCESSING METHOD

(71) Applicant: FUJITSU LIMITED, Kawasaki (JP)

(72) Inventors: Akihiko Kasagi, Kawasaki (JP); Akihiro Tabuchi, Kawasaki (JP); Masafumi Yamazaki, Tachikawa (JP)

(73) Assignee: FUJITSU LIMITED, Kawasaki (JP)

( * ) Notice: Subject to any disclaimer, the term of this patent is extended or adjusted under 35 U.S.C. 154(b) by 412 days.

(21) Appl. No.: 15/931,629

(22) Filed: May 14, 2020

(65) Prior Publication Data

US 2020/0372336 A1    Nov. 26, 2020

(30) Foreign Application Priority Data

May 23, 2019   (JP) .............................. JP2019-097139

(51) Int. Cl.
  *G06N 3/08*     (2006.01)
  *G06N 3/04*     (2006.01)
(52) U.S. Cl.
  CPC ................ *G06N 3/08* (2013.01); *G06N 3/04* (2013.01)
(58) Field of Classification Search
  CPC ........ G06N 3/08; G06N 3/0445; G06N 3/082; G06N 3/084; G06N 3/10; G06N 5/00; G06N 20/00
  See application file for complete search history.

(56) References Cited

U.S. PATENT DOCUMENTS

| 2018/0032911 A1 | 2/2018 | Yamazaki et al. |
| 2019/0122141 A1 | 4/2019 | Zhen et al. |
| 2019/0130275 A1* | 5/2019 | Chen .................... G06N 3/0454 |
| 2019/0340508 A1* | 11/2019 | Liu .......................... G06N 3/08 |

(Continued)

FOREIGN PATENT DOCUMENTS

| JP | 2009-099008 A | 5/2009 |
| JP | 2018-018220 A | 2/2018 |

OTHER PUBLICATIONS

Koliousis, Alexandros et al., "CROSSBOW: Scaling Deep Learning with Small Batch Sizes on Multi-GPU Servers", arxiv.org, Cornell University Library, 201 Olin Library Cornell University Ithaca, NY 14853, Jan. 8, 2019, pp. 1-14.

(Continued)

*Primary Examiner* — Pegeman Karimi
(74) *Attorney, Agent, or Firm* — Fujitsu Patent Center

(57) ABSTRACT

Each of a plurality of processors enters, to a model representing a neural network and including a common first weight, first data different from that used by the other processors, calculates an error gradient for the first weight, and integrates the gradients calculated by each processor. Each processor stores the first weight in a memory and updates the weight of the model to a second weight based on a hyperparameter value different from those used by the other processors, the integrated error gradient, and the first weight. Each processor enters common second data to the model, compares the evaluation results acquired by each processor, and selects a common hyperparameter value. Each processor updates the weight of the model to a third weight based on the selected hyperparameter value, the integrated error gradient, and the first weight stored in the memory.

7 Claims, 17 Drawing Sheets

(56) References Cited

U.S. PATENT DOCUMENTS

2020/0020393 A1* 1/2020 Al-Shamma ........... G11C 16/10
2020/0065863 A1* 2/2020 Hong ....................... G06N 5/04
2020/0184337 A1* 6/2020 Baker .................... G06N 3/082

OTHER PUBLICATIONS

Extended European Search Report dated Oct. 23, 2020 for corresponding European Patent Application No. 20172136.2, 10 pages.

* cited by examiner

INFORMATION PROCESSING APPARATUS 100

BASIC VALUE TABLE 151

| HYPERPARAMETER | BASIC VALUE |
|---|---|
| learningRate (lr) | ... |
| weightDecay (wd) | ... |
| momentum | ... |

ADJUSTMENT COEFFICIENT TABLE 152

| RANK | c0 | c1 | c2 | SELECTION NUMBER |
|---|---|---|---|---|
| 0 | 1 | 1 | 1 | 0 |
| 1 | 2 | 1 | 1 | 0 |
| 2 | 1 | 2 | 1 | 0 |
| 3 | 1 | 1 | 2 | 0 |
| 4 | 2 | 2 | 1 | 0 |
| 5 | 1 | 2 | 2 | 0 |
| 6 | 2 | 1 | 2 | 0 |
| 7 | 2 | 2 | 2 | 0 |
| ... | ... | ... | ... | ... |

$W(t) = W(t-1) - (\text{momentum} * c2 * V(t-1)$
$\qquad + \text{lr} * c0 * (\Delta W(t-1) + \text{wd} * c1 * W(t-1)))$

‖

52 c0, c1, c2 = get_coeff ( my_rank )
temp_w[ ] = weight[ ]
rescaled_grad[ ] = lr * c0 * ( grad[ ] + wd * c1 * temp_w[ ] )
weight[ ] = temp_w[ ] − ( momentum * c2 * state[ ] + rescaled_grad[ ] )

‖

53

```
float *c;
c = get_coeff( my_rank );

# pragma omp parallel for
for( i = 0; i < N; i++ ) {
    temp_w[ i ] = weight[ i ];
    rescaled_grad[ i ] = lr * c[0] * ( grad[ i ] + wd * c[1] * temp_w[ i ] );
    weight[ i ] = temp_w[ i ]
                - ( momentum * c[2] * state[ i ] + rescaled_grad[ i ] );
}
```

$V(t) = \underline{momentum * b2} * V(t-1) + \underline{lr * b0} * (\Delta W(t-1) + \underline{wd * b1} * W(t-1))$
$W(t) = W(t-1) - V(t)$

‖

55 b0, b1, b2 = get_coeff ( best_rank )
rescaled_grad[ ] = <u>lr * b0</u> * ( grad[ ] + <u>wd * b1</u> * temp_w[ ] )
state[ ] = <u>momentum * b2</u> * state[ ] + rescaled_grad[ ]
weight[ ] = temp_w[ ] − state[ ]

‖

56

```
float *b;
b = get_coeff( best_rank );

# pragma omp parallel for
for( i = 0; i < N; i++ ) {
    rescaled_grad[ i ] = lr * b[0] * ( grad[ i ] + wd * b[1] * temp_w[ i ] );
    state[ i ] = momentum * b[2] * state[ i ] + rescaled_grad[ i ];
    weight[ i ] = temp_w[ i ] − state[ i ];
}
```

FIG. 11

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2019-097139, filed on May 23, 2019, the entire contents of which are incorporated herein by reference.

FIELD

The embodiments discussed herein are related to an information processing apparatus and an information processing method.

BACKGROUND

Machine learning is performed as computer-aided data analysis. In machine learning, data that indicates a plurality of samples having known results is entered to a computer. The computer analyzes the data and generates a model that generalizes a relationship between a cause (which may be referred to as an explanatory variable or an independent variable) and a result (which may be referred to as an objective variable or a dependent variable). The generated model is used to predict an unknown result. For example, the computer analyzes a plurality of images including training labels that indicate kinds of objects in these images and generates an image recognition model that determines kinds of objects from images.

There is machine learning that uses neural networks (NNs) as models. A typical neural network includes an input layer, an output layer, and at least one intermediate layer, and a plurality of nodes are arranged in each of these layers. Two nodes belonging to neighboring layers are connected to each other via a weighted edge. An individual node represents a neuron, and an individual edge represents a synapse. The values of the explanatory variables entered to the input layer are propagated to the downstream layers based on the edge weights, and the values of the objective variables are outputted from the output layer. By adjusting these weights, the neural network is able to approximate various functions. A neural network including many intermediate layers may be referred to as a deep neural network (DNN), and machine learning that uses a deep neural network may be referred to as deep learning (DL).

In typical machine learning using a neural network, a computer enters feature amounts included in training data to the input layer, propagates the feature amounts in the forward direction from the input layer to the output layer, and reads the deduction results of the objective variables with respect to the feature amounts from the output layer. By evaluating the errors between the deduction results and the respective training labels included in the training data and propagating the error information in the backward direction from the output layer to the input layer, the computer calculates error gradients with respect to the respective edge weights. The computer updates these edge weights based on the respective error gradients. Such an algorithm for updating weights may be referred to as backpropagation.

There is proposed a parallel operation apparatus that performs machine learning using a hierarchical neural network in a parallel manner by using a plurality of arithmetic units. There is also proposed a parallel processing apparatus that performs deep learning in a parallel manner by using a plurality of calculators each of which includes a graphics processing unit (GPU).

See Japanese Laid-open Patent Publication No. 2009-99008 and Japanese Laid-open Patent Publication No. 2018-18220, for example.

Hyperparameters are used to control the behavior of machine learning, and hyperparameter values affect the accuracy of a model generated by the machine learning. The user may specify these hyperparameter values. Depending on the machine learning, many hyperparameters are used. In the case of a neural network, various kinds of hyperparameters are used, such as for the number of intermediate layers, the number of nodes in an individual layer, an activation function, and a learning rate. The activation function is a function that converts the weighted sum of outputs of an upstream layer into an output that is propagated to a downstream layer. The learning rate represents the degree to which the error gradients are reflected on the weights.

It is preferable that hyperparameter values be adjusted so as to generate an accurate model. However, since optimum hyperparameter values depend on the datasets used as the training data, the optimum hyperparameter values are not previously known in many cases. In addition, there are many candidates used as the hyperparameter values. Thus, there are cases in which hyperparameter search is performed. In this search, machine learning uses several hyperparameter values to estimate hyperparameter values that improve the model's accuracy, and machine learning is performed again. This processing is repeated to determine optimum hyperparameter values.

However, since the machine learning using a neural network performs a large amount of calculation, even a single machine learning operation is likely to need a long learning time. Thus, the machine learning has a problem in that the learning time is significantly extended as the computer repeatedly performs the machine learning while changing the hyperparameter values.

SUMMARY

According to one aspect, there is provided an information processing apparatus including: a plurality of processors; and a plurality of memories corresponding to the plurality of processors, wherein each of the plurality of processors is configured to execute a process including: entering, to a model which represents a neural network and which includes a first weight common among the plurality of processors, first data different from first data used by other processors, calculating an error gradient with respect to the first weight based on an output of the model, and integrating the error gradient and other error gradients calculated by the other processors to obtain an integrated error gradient, storing the first weight in a corresponding memory among the plurality of memories and updating a weight of the model to a second weight based on a hyperparameter value different from hyperparameter values used by the other processors, the integrated error gradient, and the first weight, entering second data common among the plurality of processors to the model, evaluating accuracy of an output of the model, comparing an evaluation result of the accuracy with evaluation results acquired by the other processors, and selecting a hyperparameter value common among the plurality of processors, and updating the weight of the model to a third weight based on the selected hyperparameter value, the integrated error gradient, and the first weight stored in the corresponding memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates examples of a basic value table and an adjustment coefficient table;

FIG. 8 illustrates calculation examples in a try_update phase;

FIG. 11 illustrates calculation examples in a revert_update phase;

DESCRIPTION OF EMBODIMENTS

Hereinafter, embodiments will be described with reference to the accompanying drawings.

First Embodiment

A first embodiment will be described.

Figure 1:
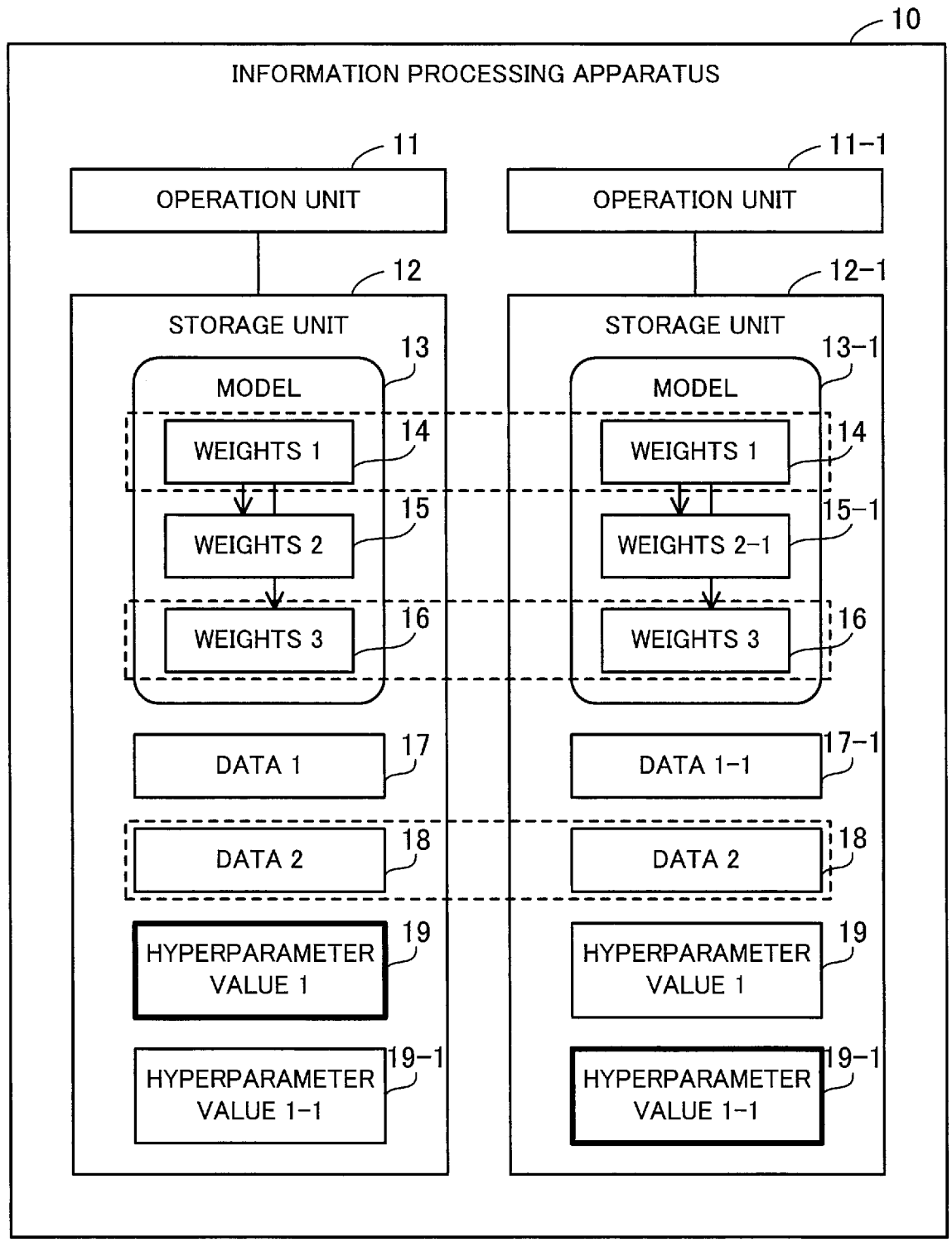
FIG. 1 illustrates an example of an information processing apparatus according to a first embodiment.

FIG. 1 illustrates an example of an information processing apparatus according to a first embodiment.

This information processing apparatus 10 according to the first embodiment performs machine learning that uses a neural network in a parallel manner by using a plurality of operation units. The neural network may be a deep neural network including many intermediate layers, and the machine learning may be deep learning that uses a deep neural network. The neural network may be an image recognition model that determines kinds of objects in images or a convolutional neural network (CNN). The information processing apparatus 10 may be referred to as a machine learning apparatus or a computer, for example. The information processing apparatus 10 may be a client apparatus or a server apparatus.

The information processing apparatus 10 includes a plurality of operation units including operation units 11 and 11-1 and a plurality of storage units including storage units 12 and 12-1 for the operation units 11 and 11-1, respectively. The operation unit 11 uses the storage unit 12, and the operation unit 11-1 uses the storage unit 12-1.

For example, the operation units 11 and 11-1 are processors such as GPUs, central processing units (CPUs), or digital signal processors (DSPs). The individual GPU may be a processor used as a general-purpose computing on graphics processing unit (GPGPU). These processors execute a program stored in a memory. A group of processors may be referred to as "a multiprocessor" or simply "a processor". The storage units 12 and 12-1 are volatile semiconductor memories, for example. The storage units 12 and 12-1 may be random access memories (RAMs) or GPU memories. Alternatively, the storage units 12 and 12-1 may be non-volatile storages.

Each of the plurality of operation units including the operation units 11 and 11-1 repeatedly performs the following processing. Hereinafter, the processing performed by the operation unit 11 will be described mainly.

The operation unit 11 holds a model 13. The model 13 is stored in the storage unit 12, for example. The model 13 represents a neural network and includes the weights of the neural network. The neural network includes an input layer, an output layer, and at least one intermediate layer, and a plurality of nodes are arranged in each of these layers. Two nodes belonging to neighboring layers are connected to each other via a weighted edge. At this point, the weights of the model 13 are set to weights 14 (first weight). The weights 14 are common weights among the plurality of operation units. The operation unit 11-1 holds a model 13-1. The model 13-1 is stored in the storage unit 12-1, for example. The weights of the model 13-1 are set to the weights 14, as is the case with the model 13. Thus, at this point, both the model 13 and the model 13-1 represent the same neural network.

The operation unit 11 enters data 17 (first data) to the model 13 including the weights 14 and acquires an output of the model 13. The data 17 is stored in the storage unit 12, for example. The data 17 includes at least one record, each of which includes a feature amount as an explanatory variable and a training label as an objective variable. The output of the model 13 includes deduction results as the objective variables for the data 17. When the model 13 is an image recognition model, the output is an object recognition result. The first data used at this point differs depending on the operation unit. The operation unit 11-1 enters data 17-1 to the model 13-1 including the weights 14 and acquires an output of the model 13-1. The data 17-1 is stored in the storage unit 12-1, for example. Since the different input data is used, the output of the model 13 acquired by the operation unit 11 is different from the output of the model 13-1 acquired by the operation unit 11-1.

The operation unit 11 calculates error gradients with respect to the weights 14 based on the output of the model 13. The error gradients are calculated by backpropagation, for example. In backpropagation, the error gradients with respect to the weights 14 of the edges are calculated by evaluating the error between the output of the model 13 and the individual training labels and propagating the error information in the backward direction from the output layer to the input layer. When an error is assumed to be a function of a weight, the error gradient corresponds to a value obtained by performing partial differentiation on the error by the weight. The operation unit 11-1 calculates error gradients with respect to the weights 14 based on the output of the model 13-1. Since the different input data is used for the error evaluation, the error gradients calculated by the operation unit 11 are different from the error gradients calculated by the operation unit 11-1.

The operation unit 11 integrates the error gradients calculated by the operation unit 11 and the error gradients calculated by the other operation units to calculate integrated error gradients. For example, the operation unit 11 communicates at least one of the other operation units and totals the error gradients calculated by the plurality of operation units to calculate the integrated error gradients. To collect the error gradients calculated by the other operation units, collective communication such as AllReduce communication, broadcast communication, or AllGather communication may be used. Depending on the communication algorithm, the operation unit 11 do not need to communicate with all the other operation units directly. The operation unit 11-1 also calculates the integrated error gradients. The integrated error gradients calculated by the operation unit 11 are the same as the integrated error gradients calculated by the operation unit 11-1.

The operation unit 11 stores the current weights 14 of the model 13 in the storage unit 12 so that the current weights of the model 13 will not be lost even after the weights are updated. For example, the operation unit 11 copies and saves the weights 14 inside the storage unit 12. The operation unit 11-1 also stores the weights 14 of the model 13-1 in the storage unit 12-1 so that the current weights of the model 13-1 will be not lost even after the weights are updated.

The operation unit 11 updates the weights of the model 13 to weights 15 (second weight) based on a hyperparameter value 19, the integrated error gradients, and the weights 14. The hyperparameter value 19 is stored in the storage unit 12, for example. The hyperparameter is a control parameter that controls the behavior of the machine learning. Among various hyperparameters referred to in the machine learning, the hyperparameter value 19 relates to the learning rate that represents the degree to which the error gradients are reflected on the weights. A higher learning rate changes the weights more, and a lower learning rate changes the weights less. For example, a product of the integrated error gradients and the hyperparameter value 19 is subtracted from the weights 14. The hyperparameter value 19 used herein differs depending on the operation unit.

The operation unit 11-1 updates the weights of the model 13-1 to weights 15-1 (second weight) based on a hyperparameter value 19-1, the integrated error gradients, and the weights 14. The hyperparameter value 19-1 is stored in the storage unit 12-1, for example. The storage unit 12 may additionally hold the hyperparameter value 19-1, and the storage unit 12-1 may additionally hold the hyperparameter value 19. Since the hyperparameter values used are different, the weights 15 calculated by the operation unit 11 are different from the weights 15-1 calculated by the operation unit 11-1.

Each of the hyperparameter values 19 and 19-1 may be generated by applying an adjustment coefficient, which differs depending on the operation unit, to a hyperparameter basic value common between the plurality of operation units. For example, the hyperparameter value 19 and 19-1 are each calculated by a product of the hyperparameter basic value and a corresponding adjustment coefficient. The adjustment coefficients used by the operation units may be determined from identification information that differs depending on the operation unit, such as the message passing interface (MPI) ranks. The storage units 12 and 12-1 may hold the hyperparameter basic value and their respective adjustment coefficient. The plurality of adjustment coefficients may be managed in a table format. In each of the plurality of operation units, a function for converting its identification information into the corresponding adjustment coefficient may be defined.

The operation unit 11 enters data 18 (second data) to the model 13 including the weights 15, acquires an output of the model 13, and evaluates the accuracy of the output of the model 13. The data 18 is stored in the storage unit 12, for example. The second data used at this point is common among the plurality of operation units. The operation unit 11 evaluates the accuracy by comparing the output of the model 13 with the training labels included in the data 18. For example, the accuracy represents an accuracy rate, which is the rate of accurate records with respect to the plurality of records included in the data 18. If a deduction result of the model 13 for a record matches the corresponding training label, this record is determined to be an accurate record. The operation unit 11-1 enters data 18 to the model 13-1 including the weights 15-1, acquires an output of the model 13-1, and evaluates the accuracy of the output of the model 13-1. Since the weights of the models are different, the accuracy evaluation result acquired by the operation unit 11 is different from the accuracy evaluation result acquired by the operation unit 11-1.

The operation unit 11 compares the evaluation result acquired thereby with the evaluation results acquired by the other operation units and selects one of the hyperparameter values based on the comparison result. In this comparison, the operation unit 11 communicates at least one of the other operation units and collects the evaluation results acquired by the other operation units. To collect the evaluation results acquired by the other operation units, collective communication such as AllGather communication, AllReduce communication, or broadcast communication may be used, as is the case with the collection of the error gradients.

The hyperparameter value to be selected here is, for example, the hyperparameter value used by the operation unit that has calculated the highest accuracy among the plurality of operation units. If the operation unit 11-1 has calculated the highest accuracy, the hyperparameter value 19-1 used by the operation unit 11-1 is selected. The operation unit 11 may determine the identification information corresponding to the operation unit that has calculated the highest accuracy and select an adjustment coefficient based on the determined identification information. The hyperparameter value is determined from the selected adjustment coefficient and the hyperparameter basic value.

The operation unit 11-1 also collects the evaluation results acquired by the other operation units and selects one of the hyperparameter values. The evaluation results collected by the operation unit 11 and the evaluation results collected by the operation unit 11-1 are the same evaluation results. Thus, the hyperparameter value selected by the operation unit 11 and the hyperparameter value selected by the operation unit 11-1 are the same hyperparameter value. The selected hyperparameter value is the hyperparameter value that achieves the best performance at this point of time.

The operation unit 11 updates the weights of the model 13 to weights 16 (third weight), based on the selected hyperparameter value, the above integrated error gradients, and the weights 14 stored in the storage unit 12 before the update of the weights 14. For example, a product of the integrated error gradients and the selected hyperparameter value is subtracted from the weights 14. The operation unit 11-1 updates the weights of the model 13-1 to weights 16, based on the selected hyperparameter value, the above integrated error gradients, and the weights 14 stored in the storage unit 12-1. Since the operation unit 11 and the operation unit 11-1 use the same hyperparameter value, the same integrated error gradients, and the same weights 14, the operation unit 11 and the operation unit 11-1 calculate the same weights.

In the information processing apparatus 10 according to the first embodiment, a plurality of operation units individually calculate different error gradients from a model having the first weights common among the operation units and from different data and calculate integrated error gradients in which the different error gradients are integrated. Next, each of the plurality of operation units saves the first weights and updates the weights to the second weights different among the operation units based on a different hyperparameter value, the integrated error gradients, and the first weights. Next, each of the plurality of operation units calculates a different accuracy from the model having the second weights different among the operation units and data common among the operation units and selects a common hyperparameter value based on the different accuracies acquired. Next, each of the plurality of operation units updates the weights to third weights common among the plurality of operation units based on the common hyperparameter value, the integrated error gradients, and the saved first weights.

In this way, the search for the hyperparameter relating to the learning rate is performed in a single machine learning operation in which the individual operation unit repeats entering training data to a neural network and updating the weights. Thus, the search for the hyperparameter is performed more efficiently, and the number of times the individual operation unit repeats machine learning while changing various hyperparameter values is reduced. As a result, a total learning time until the search for the hyperparameter converges is shortened. In addition, the model accuracy is improved efficiently under the constraint of the learning time.

Second Embodiment

Next, a second embodiment will be described.

Figure 2:
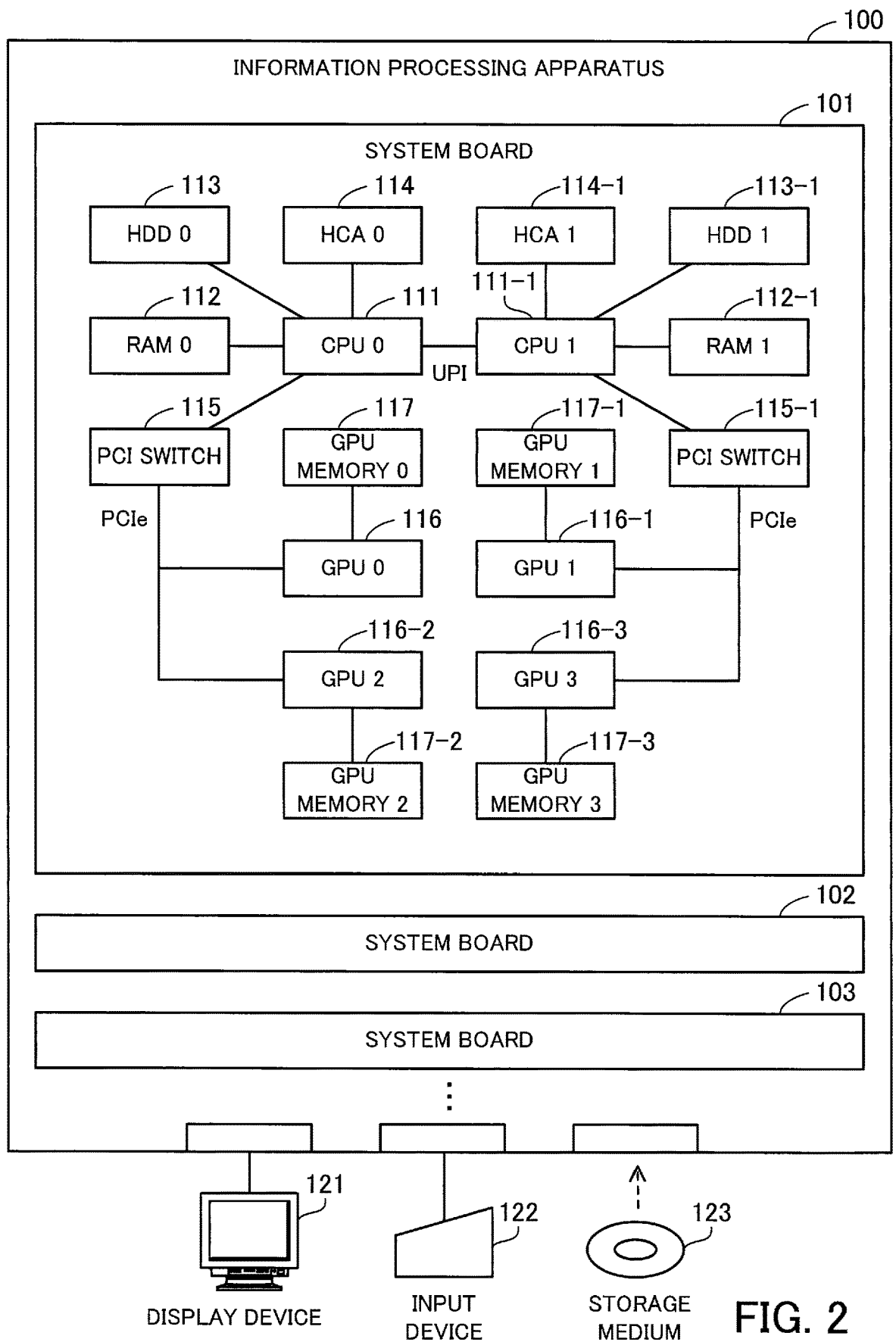
FIG. 2 illustrates a hardware example of an information processing apparatus according to a second embodiment.

FIG. 2 illustrates a hardware example of an information processing apparatus according to a second embodiment.

This information processing apparatus 100 according to the second embodiment performs machine learning using a neural network in a parallel manner by using a plurality of GPUs. The second embodiment assumes deep learning using a deep neural network. For example, training data used in the machine learning is images including training labels that indicate kinds of objects in these images. The neural network is a convolutional neural network for image recognition. The information processing apparatus 100 may be referred to as a machine learning apparatus, a parallel processing apparatus, or a parallel computer, for example.

The information processing apparatus 100 includes a plurality of system boards including system boards 101 to 103. Each of these system boards includes a plurality of CPUs, a plurality of RAMs, a plurality of hard disk drives (HDDs), a plurality of GPUs, and a plurality of CPU memories, for example. These system boards may be implemented by the same hardware. Of all the system boards, the system board 101 will be described as a representative example.

The system board 101 includes CPUs 111 and 111-1, RAMs 112 and 112-1, HDDs 113 and 113-1, host channel adapters (HCAs) 114 and 114-1, and peripheral component interconnection (PCI) switches 115 and 115-1. The system board 101 also includes GPUs 116, 116-1, 116-2, and 116-3 and CPU memories 117, 117-1, 117-2, and 117-3.

The CPU 111 (CPU 0) and the CPU 111-1 (CPU 1) are connected to each other via Ultra Path Interconnection (UPI), which is an inter-processor connection interface. The CPU 111 is connected to the RAM 112 (RAM 0), the HDD 113 (HDD 0), the HCA 114 (HCA 0), and the PCI switch 115. The CPU 111-1 is connected to the RAM 112-1 (RAM 1), the HDD 113-1 (HDD 1), the HCA 114-1 (HCA 1), and the PCI switch 115-1.

The PCI switch 115 is connected to the CPU 116 (CPU 0) and the GPU 116-2 (CPU 2) via peripheral component interconnection express (PCIe), which is an inter-peripheral connection interface. The PCI switch 115-1 is connected to the CPU 116-1 (CPU 1) and the GPU 116-3 (CPU 3) via PCIe. The CPU 116 is connected to the GPU memory 117 (GPU memory 0), and the GPU 116-1 is connected to the GPU memory 117-1 (GPU memory 1). The GPU 116-2 is connected to the CPU memory 117-2 (CPU memory 2), and the CPU 116-3 is connected to the CPU memory 117-3 (CPU memory 3).

The CPUs 111 and 111-1 are main processors that execute program commands. The CPU 111 loads a program stored in a non-volatile storage such as the HDD 113 to the RAM 112 and executes the program. The CPU 111-1 loads a program stored in a non-volatile storage such as the HDD 113-1 to the RAM 112-1 and executes the program.

The RAMs 112 and 112-1 are volatile semiconductor memories that temporarily hold programs and data. The RAM 112 is used by the CPU 111, and the RAM 112-1 is used by the CPU 111-1.

The HDDs 113 and 113-1 are non-volatile storages that hold software programs such as an operating system (OS), middleware, and application software and data. The HDD 113 is used by the CPU 111, and the HDD 113-1 is used by the CPU 111-1. A different kind of device such as a flash memory or a solid-state drive (SSD) may be used as the non-volatile storages.

The HCAs 114 and 114-1 are communication interfaces that communicate with the CPUs of the other system boards such as the system boards 102 and 103. The HCAs 114 and 114-1 perform communication in accordance with communication standards based on InfiniBand. The HCAs 114 and 114-1 establish connection via cables and switches of InfiniBand that are wired communication devices in the information processing apparatus 100. The HCA 114 is used by the CPU 111, and the HCA 114-1 is used by the CPU 111-1.

Each of the PCI switches 115 and 115-1 is a relay device that relays the communication between the corresponding CPU and GPUs. The PCI switch 115 is used by the CPU 111 and communicates with the GPUs 116 and 116-2 in accordance with communication standards based on PCIe. The PCI switch 115-1 is used by the CPU 111-1 and communicates with the GPUs 116-1 and 116-3 in accordance with communication standards based on PCIe.

The GPUs 116, 116-1, 116-2, and 116-3 are processors as hardware accelerators and execute program commands. The GPUs 116, 116-1, 116-2, and 116-3 include many GPU cores suitable for image processing. The GPUs 116, 116-1, 116-2, and 116-3 may be GPGPUs.

The CPU memories 117, 117-1, 117-2, and 117-3 are volatile semiconductor memories that temporarily hold CPU programs and data. The GPU memory 117 is used by the GPU 116, and the CPU memory 117-1 is used by the CPU 116-1. The CPU memory 117-2 is used by the GPU 116-2, and the GPU memory 117-3 is used by the GPU 116-3.

When the machine learning is performed by using the GPUs 116, 116-1, 116-2, and 116-3, data for the machine learning is transferred as follows. The data for the machine learning is stored in the HDDs 113 and 113-1. The same or different data may be stored in the HDDs 113 and 113-1.

The CPU 111 transfers data used at least by the CPU 116 among the data stored in the HDD 113 to the GPU memory 117 via the PCI switch 115 and the GPU 116. The data transferred to the CPU memory 117 may include data that is not used by the CPU 116.

Likewise, the CPU 111 transfers data used at least by the GPU 116-2 among the data stored in the HDD 113 to the CPU memory 117-2 via the PCI switch 115 and the CPU 116-2. The CPU 111-1 transfers data used at least by the CPU 116-1 among the data stored in the HDD 113-1 to the CPU memory 117-1 via the PCI switch 115-1 and the CPU 116-1. The CPU 111-1 transfers data used at least by the CPU 116-3 among the data stored in the HDD 113-1 to the CPU memory 117-3 via the PCI switch 115-1 and the CPU 116-3.

When the CPU 116 or 116-2 uses data stored in the HDD 113-1, the CPU 111 may acquire the data from the CPU 111-1. When the GPU 116-1 or 116-3 uses data stored in the HDD 113, the CPU 111-1 may acquire the data from the CPU 111.

When any one of the GPUs 116, 116-1, 116-2, and 116-3 communicates with a GPU in the same system board, this communication is performed via at least one of the CPUs 111 and 111-1. When any one of the GPUs 116, 116-1, 116-2, and 116-3 communicates with a GPU in a different system board, this communication is performed via the HCA 114 or the HCA 114-1.

In addition, the information processing apparatus 100 may be connected to a display device 121 and an input device 122 and may read a storage medium 123. For example, the information processing apparatus 100 includes an output interface that is connected to the display device 121. Any kind of display apparatus may be used as the display device 121, examples of which include a cathode ray tube (CRT) display, a liquid crystal display (LCD), an organic electro-luminescence (OEL) display, and a projector. Other than the display device 121, an output device such as a printer may be connected to the information processing apparatus 100.

In addition, for example, the information processing apparatus 100 includes an input interface that is connected to the input device 122. Any kind of input device may be used as the input device 122, examples of which include a mouse, a touch panel, and a keyboard. A plurality of kinds of input devices may be connected to the information processing apparatus 100. In addition, for example, the information processing apparatus 100 includes a medium reading device that reads a program or data stored in the storage medium 123. Any kind of storage medium may be used as the storage medium 123, examples of which include a magnetic disk such as a flexible disk (FD) and an HDD, an optical disc such as a compact disc (CD) and a digital versatile disc (DVD), and a semiconductor memory.

For example, the medium reading device copies a program or data read from the storage medium 123 to another storage medium such as a RAM or an HDD. The read program is executed by a CPU or a GPU, for example. The storage medium 123 may be a portable storage medium and may be used for distribution of a program or data. The storage medium 123 may be referred to as a computer-readable storage medium.

Outputting a screen to the display device 121, receiving an input signal from the input device 122, and reading the storage medium 123 may be controlled by a CPU in any one of the system boards or by a management CPU of the information processing apparatus 100. The information processing apparatus 100 may include a communication interface that communicates with another information processing apparatus.

Next, a neural network will be described.

Figure 3:
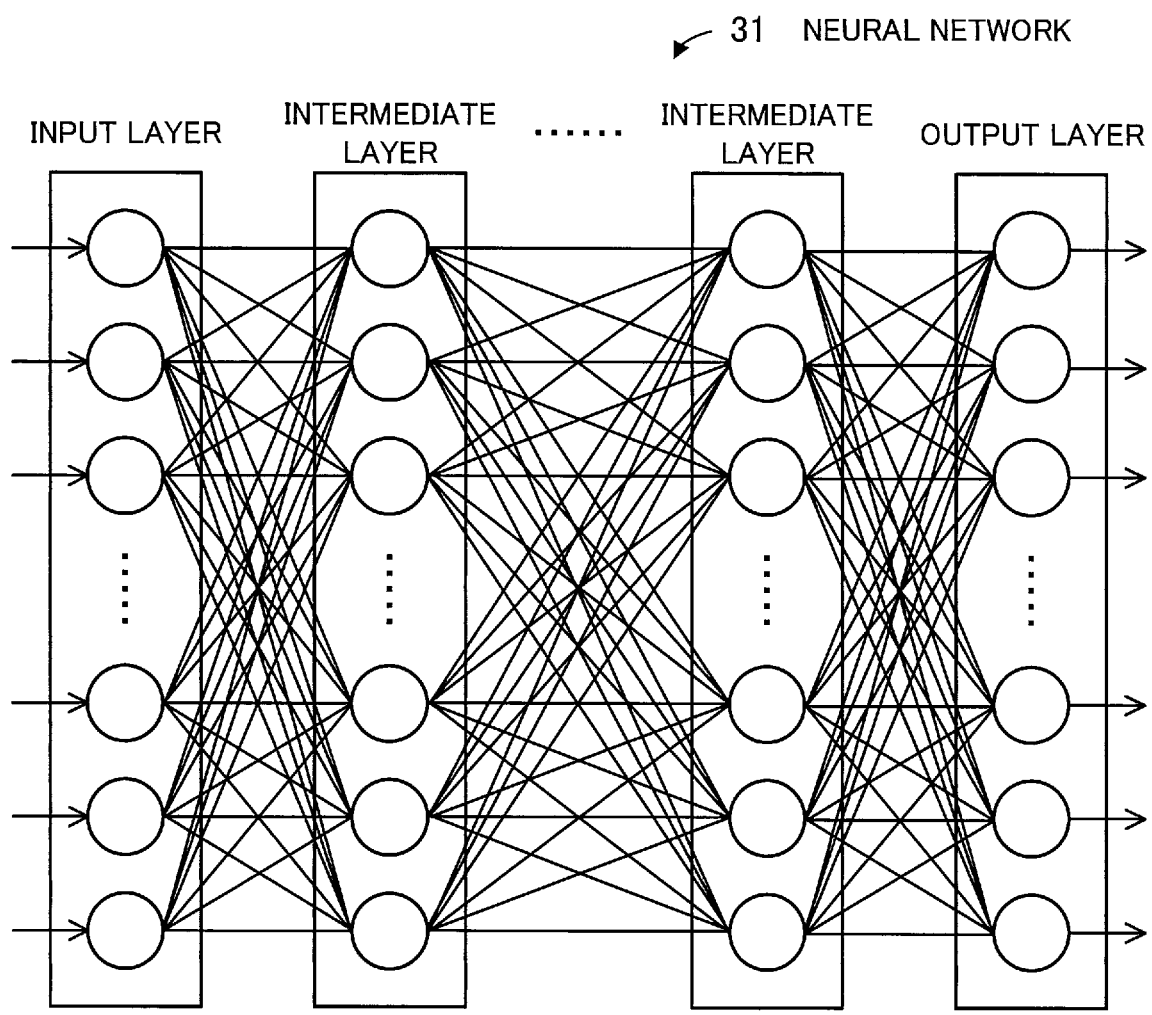
FIG. 3 illustrates an example of a neural network.

FIG. 3 illustrates an example of a neural network.

This neural network 31 includes an input layer, an output layer, and a plurality of intermediate layers between the input layer and the output layer. Each of the input layer, the intermediate layers, and the output layer includes a plurality of nodes. Each node in the input layer is connected to the plurality of nodes in the subsequent intermediate layer via edges. Each node in the output layer is connected to the plurality of nodes in the previous intermediate layer via edges. Each node in an intermediate layer is connected to the plurality of nodes in the previous layer via edges and is connected to the plurality of nodes in the subsequent layer via edges. An individual node corresponds to a neuron, and an individual edge corresponds to a synapse.

The number of intermediate layers is specified by a hyperparameter that controls the behavior of the machine learning. The value of the hyperparameter that specifies the number of intermediate layers does not change in a single machine learning operation. In addition, the number of nodes in an individual layer is also specified by a hyperparameter. The value of the hyperparameter that species the number of nodes does not change in a single machine learning operation.

A weight is given to each edge. When the machine learning is started, the weights are set to initial values, and the weights are determined through the machine learning. The weights of the neural network 31 are model parameters to be learned. By adjusting the weights, the neural network 31 is able to approximate various functions. Feature amounts as explanatory variables are entered to the input layer. The feature amounts entered to the input layer are propagated to the output layer via the plurality of intermediate layers. Deduction results as objective variables are outputted by the output layer. In the case of image recognition, feature amounts of images are entered to the input layer, and image recognition results are outputted by the output layer. In this case, the output layer may output binary data that indicates whether an image belongs to a certain object kind (class) or may output continuous value data that indicates a probability with which an image belongs to a certain class.

Figure 4:
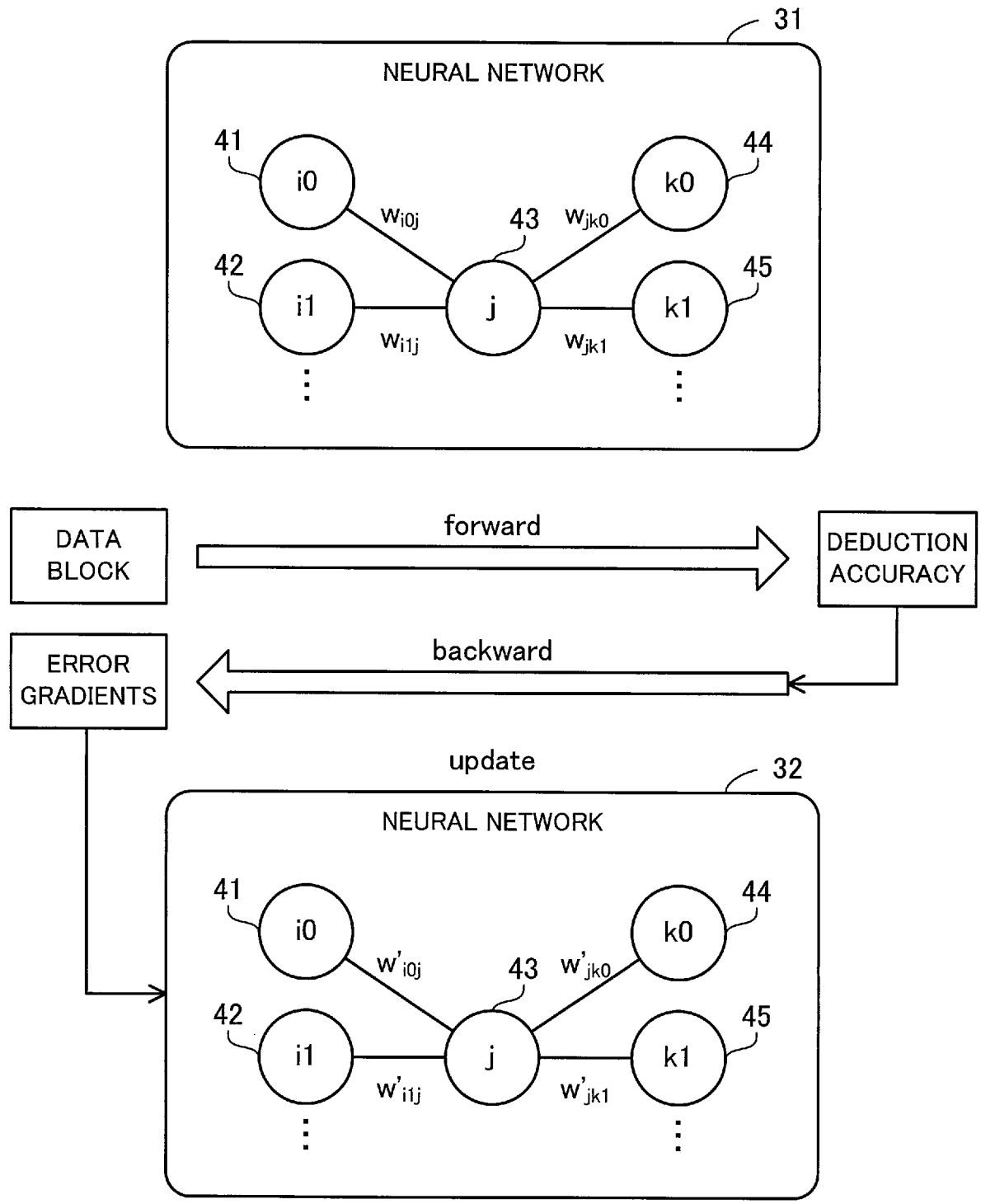
FIG. 4 illustrates an example of learning of the neural network.

FIG. 4 illustrates an example of learning of the neural network.

In many cases, the weights of the neural network 31 are learned by repeating a plurality of phases including forward, backward, and update phases.

In the forward phase, feature amounts included in a data block are entered to the input layer of the neural network 31, and deduction results corresponding to the data block are outputted by the output layer of the neural network 31. Next, a deduction accuracy indicating the errors between the deduction results and the training labels included in the data block is calculated.

The second embodiment assumes mini-batch learning as the machine learning data use method. In mini-batch learning, a data block used in a single operation includes about a few dozen records (samples). Each record includes a feature amount as an explanatory variable and a training label as an objective variable. The feature amount is entered to the input layer per record, and the deduction result is outputted by the output layer per record. The deduction accuracy of an individual data block represents the average of errors between the deduction results of the records and the corresponding training labels. The machine learning according to the second embodiment may be applied to online learning that uses a single record in a single operation.

In the forward phase, the feature amounts entered to the input layer are propagated to the output layer in the forward direction as follows. FIG. 4 assumes that the neural network 31 includes nodes 41 to 45. The node 43 (node j) belongs to an intermediate layer. The node 41 (node i0) and the node 42 (node i1) belong to the previous layer of the layer of the node 43. The node 44 (node k0) and the node 45 (node k1) belong to the subsequent layer of the layer of the node 43. The edge between the node 41 and the node 43 is given a weight $w_{i0j}$. The edge between the node 42 and the node 43 is given a weight $w_{i1j}$. The edge between the node 43 and the node 44 is given a weight $w_{jk0}$. The edge between the node 43 and the node 45 is given a weight $w_{jk1}$.

In the case of the node 43, by multiplying the output value of the node 41 by the weight $w_{i0j}$, multiplying the output value of the node 42 by the weight $w_{i1j}$, and adding up these products, a weighted sum of the output values of the previous layer is calculated. By entering this weighted sum to a predetermined activation function, the output value of the node 43 is calculated. The activation function is specified by a hyperparameter that controls the behavior of the machine learning. The value of the hyperparameter that specifies the activation function does not change in a single machine learning operation. The output value of the node 43 is supplied to the nodes 44 and 45. In this way, numerical values are propagated from the input layer to the output layer via the plurality of intermediate layers.

In the backward phase, error information based on the deduction accuracy is propagated from the output layer to the input layer of the neural network 31. As a result, an error gradient is calculated for each of the plurality of weights included in the neural network 31. When an error is assumed to be a function of a weight, the error gradient corresponds to a value obtained by performing partial differentiation on the error by the weight. These error gradients are used to update the weights so that the errors will be minimized.

In the backward phase, the error gradients are propagated in the backward direction from the output layer to the input layer through backpropagation. For example, the error gradients with respect to the weights $w_{i0j}$ and $w_{i1j}$ between the node 43 and the previous layer are calculated, for example, from the weights $w_{jk0}$ and $w_{jk1}$ between the node 43 and the subsequent layer, the error gradients with respect to these weights $w_{jk0}$ and $w_{jk1}$, the output value of the node 43 in the forward phase, and the output values of the nodes 41 and 42 in the previous layer. In this way, the error gradients are sequentially determined, starting with the weights closest to the output layer and ending with the weights closest to the input layer.

In the update phase, the error gradients calculated in the backward phase are reflected on the weights, to update the weights of the neural network 31. As a result, the neural network 31 is updated to a neural network 32 having different weights. For example, the weights $w_{i0j}$, $w_{i1j}$, $w_{jk0}$, and $w_{jk1}$ are updated to weights $w'_{i0j}$, $w'_{i1j}$, $w'_{jk0}$, and $w'_{jk1}$.

When the error gradients are reflected on the weights, instead of subtracting the error gradients from the current weights, the error gradients are converted into subtraction values to ease the impact of the current data block, and the obtained subtraction values are subtracted from the current weights. At this point, as will be described below, some hyperparameters relating to the learning rate are used. If the learning rate is high, the impact of the current data block is strongly reflected on the weights. In contrast, if the learning rate is low, the impact of the current data block is gently reflected on the weights. The hyperparameters relating to the learning rate are important in that changing the values of the hyperparameters change the neural network deduction accuracy, the weight convergence speed, etc.

There is additivity regarding the reflection of the error gradients on the weights. Sequentially reflecting the error gradients calculated from a certain data block and the error gradients calculated from another data block on the weights is equivalent to adding up these two sets of error gradients and reflecting the total error gradients on the weights. By using this additivity, learning of the neural network may be performed in a parallel manner.

Figure 5:
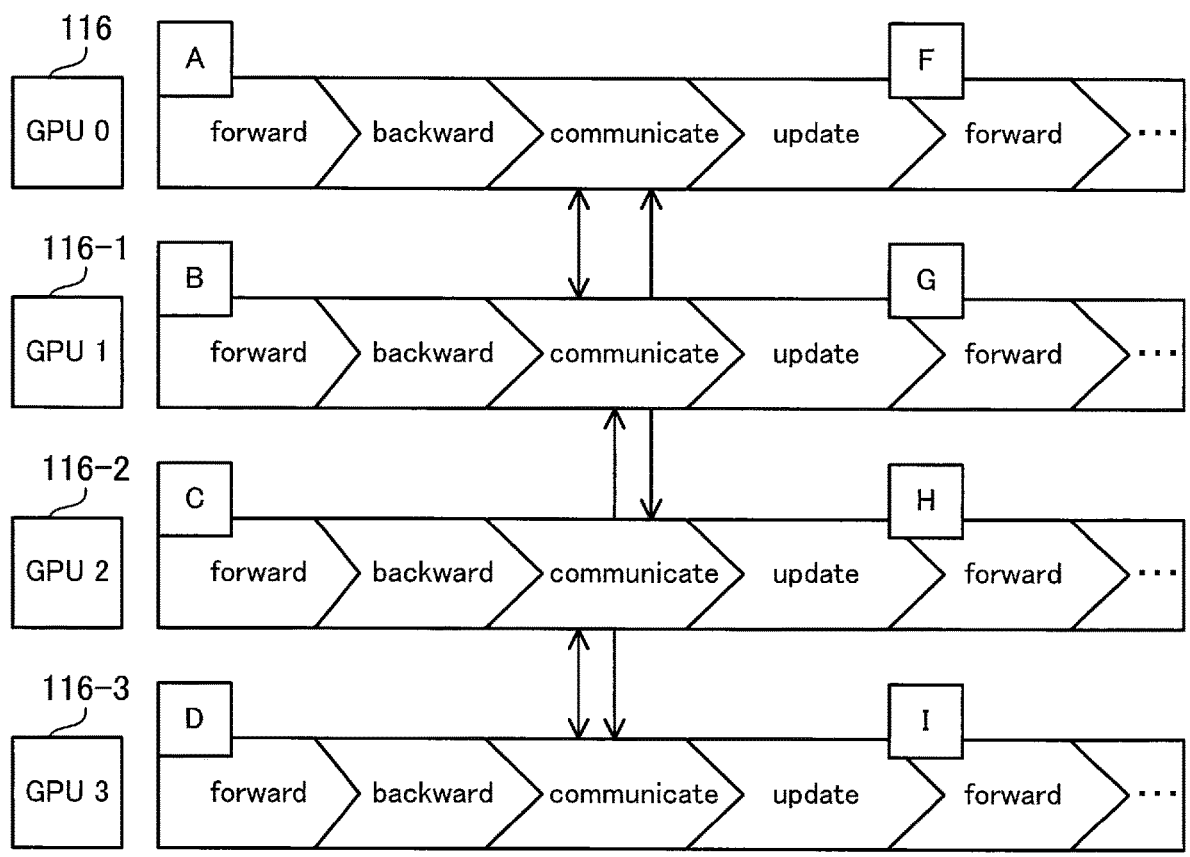
FIG. 5 illustrates a parallelization example of learning of a neural network.

FIG. 5 illustrates a parallelization example of learning of a neural network.

For ease of the description, the second embodiment assumes that parallel processing is performed by using the four GPUs of the system board 101, which are the GPUs 116, 116-1, 116-2, and 116-3. The parallelism may be improved by using 2,000 GPUs, for example. The GPUs 116, 116-1, 116-2, and 116-3 use an MPI library for inter-GPU communication. The CPU 116 executes a process of rank 0, and the GPU 116-1 executes a process of rank 1. The GPU 116-2 executes a process of rank 2, and the GPU 116-3 executes a process of rank 3.

In the parallelized machine learning, a plurality of phases including forward, backward, communicate, and update phases may be repeated. The GPUs 116, 116-1, 116-2, and 116-3 execute the individual forward, backward, communicate, and update phases in a parallel manner.

At the start of the forward phase, each of the GPUs 116, 116-1, 116-2, and 116-3 holds a neural network having weights common among these GPUs. In the forward phase, the GPUs 116, 116-1, 116-2, and 116-3 enter data blocks, which are different among these GPUs, to their respective neural networks and calculate different deduction accuracies in a parallel manner. The GPUs 116, 116-1, 116-2, and 116-3 read data blocks from their respective GPU memories and use the read data blocks. The CPU 116 uses a data block A, and the GPU 116-1 uses a data block B. The GPU 116-2 uses a data block C, and the GPU 116-3 uses a data block D.

In the backward phase, each of the CPUs 116, 116-1, 116-2, and 116-3 calculates error gradients from its own deduction accuracy. These calculations are performed in a parallel manner.

In the communicate phase, the GPUs 116, 116-1, 116-2, and 116-3 perform collective communication and integrate all the error gradients acquired by these GPUs. As a communication result, each of the GPUs 116, 116-1, 116-2, and 116-3 obtains the same error gradients. In the communicate phase, for example, AllReduce communication, which is one example of the collective communication, is used. However, AllGather communication or broadcast communication, which is also one example of the collective communication, may alternatively be used.

For example, the GPU 116 and the GPU 116-1 exchange their own error gradients and integrate these error gradients. In parallel to this, the GPU 116-2 and the GPU 116-3 exchange their own error gradients and integrate these error gradients. Next, the GPU 116 and the GPU 116-2 exchange the current integrated error gradients to acquire the final integrated error gradients. In parallel to this, the GPU 116-1 and the GPU 116-3 exchange the current integrated error gradients to acquire the final integrated error gradients. The collective communication may be performed in a parallel manner.

In the update phase, the GPUs 116, 116-1, 116-2, and 116-3 reflect the error gradients of the above integration result common among these GPUs on the weights of the neural network in a parallel manner. The GPUs 116, 116-1, 116-2, and 116-3 consequently hold a neural network having the weights common among these GPUs.

The GPUs 116, 116-1, 116-2, and 116-3 repeatedly perform the above four phases, which are the forward, backward, communicate, and update phases, while changing the data blocks. In the next forward phase, the GPU 116 uses a data block F, and the GPU 116-1 uses a data block G. The GPU 116-2 uses a data block H, and the GPU 116-3 uses a data block I.

In machine learning using a neural network, various hyperparameters are used, such as for the number of intermediate layers, the number of nodes in an individual layer, the activation function, and the learning rate. It is preferable that these hyperparameter values be adjusted so that a neural network having high deduction accuracy will be generated. However, since optimum hyperparameter values depend on a dataset used in the machine learning, the optimum hyperparameter values are not previously known. In addition, there are many candidates to be used as the hyperparameter values. Thus, hyperparameter search is performed. In this search, machine learning is performed with several hyperparameter values, hyperparameter values that improve the deduction accuracy of the neural network are estimated, and machine learning is performed again. This processing is repeated to determine optimum hyperparameter values. However, if such machine learning using a neural network is repeatedly performed, the total learning time is significantly extended.

Thus, the second embodiment supports the search for these hyperparameters in such a manner that the total learning time is shortened. Specifically, the information processing apparatus 100 automatically searches for hyperparameters relating to the learning rate among various hyperparameters in a single machine learning operation in which a plurality of phases are repeated. In this way, preferable values for the hyperparameters relating to the learning rate are narrowed down at an early stage.

Figure 6:
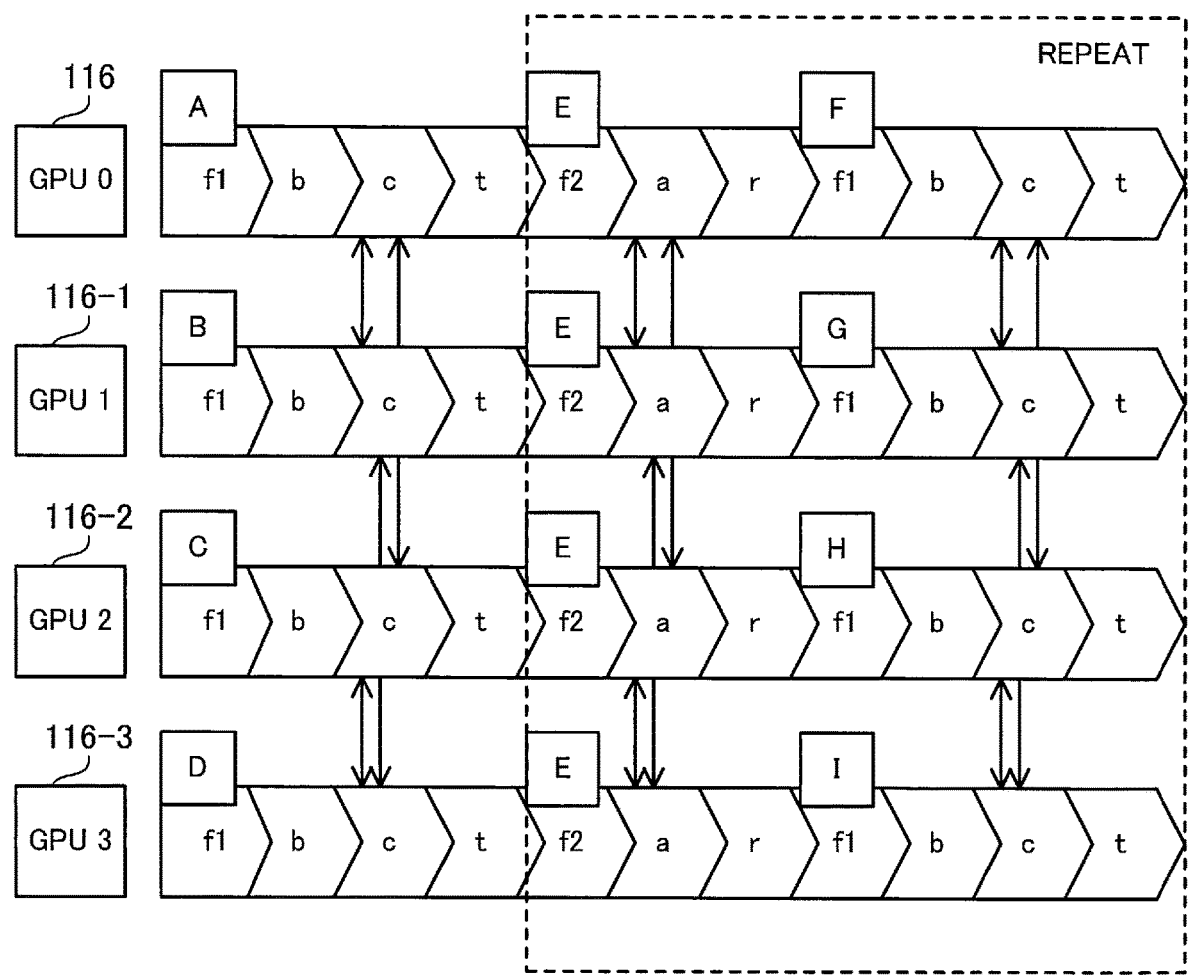
FIG. 6 illustrates a phase example in machine learning according to the second embodiment.

FIG. 6 illustrates a phase example in machine learning according to the second embodiment.

In the machine learning according to the second embodiment, seven phases, which are forward1, backward, communicate, try_update, forward2, announce, and revert_update phases, are repeated. The GPUs 116, 116-1, 116-2, and 116-3 execute these seven phases in a parallel manner.

At the start of the forward1 phase, each of the GPUs 116, 116-1, 116-2, and 116-3 holds a neural network having weights common among these GPUs. In the forward1 phase, the GPUs 116, 116-1, 116-2, and 116-3 enter data blocks, which are different among these GPUs, to their respective neural networks and calculate different deduction accuracies in a parallel manner. The GPUs 116, 116-1, 116-2, and 116-3 read data blocks from their respective GPU memories and use the read data blocks. The GPU 116 uses a data block A, and the GPU 116-1 uses a data block B. The GPU 116-2 uses a data block C, and the GPU 116-3 uses a data block D.

In the backward phase, the GPUs 116, 116-1, 116-2, and 116-3 calculate different error gradients from their respective deduction accuracies different each other. These calculations are performed in a parallel manner.

In the communicate phase, the GPUs 116, 116-1, 116-2, and 116-3 perform collective communication and integrate all the error gradients acquired by these GPUs. As a communication result, each of the GPUs 116, 116-1, 116-2, and 116-3 obtains the same error gradients. In the communicate phase, for example, AllReduce communication, which is one example of the collective communication, is used. However, AllGather communication or broadcast communication, which is also one example of the collective communication, may alternatively be used.

In the try_update phase, the GPUs 116, 116-1, 116-2, and 116-3 reflect the error gradients of the above integration result common among these GPUs on the weights of the neural network in a parallel manner. In this operation, regarding the hyperparameters relating to the learning rate, each of the GPUs 116, 116-1, 116-2, and 116-3 uses a substantially different set of hyperparameter values. Specifically, by multiplying a hyperparameter basic value by an adjustment coefficient that differs depending on the rank, the corresponding hyperparameter value is changed from the basic value. The hyperparameter basic values are specified when the machine learning is started and do not change in a single machine learning operation. By using different adjustment coefficients, the individual GPUs are able to generate pseudo-different hyperparameter values.

Since different hyperparameter values relating to the learning rate are used, the GPUs 116, 116-1, 116-2, and 116-3 hold a neural network including weights different among these GPUs. In addition, the GPUs 116, 116-1, 116-2, and 116-3 use the weights which have been used before the update in the try_update phase in the revert_update phase to be described below. Thus, the GPUs 116, 116-1, 116-2, and 116-3 save these weights inside their respective GPU memories.

In the forward2 phase, the GPUs 116, 116-1, 116-2, and 116-3 enter the same data block to their respective neural networks different from each other and calculate different deduction accuracies in a parallel manner. The GPUs 116, 116-1, 116-2, and 116-3 read a copy of the same block from their respective GPU memories and use the read data block. The CPU memories 117, 117-1, 117-2, and 117-3 are configured in such a manner that the same data block is copied when the data transfer is performed. The GPUs 116, 116-1, 116-2, and 116-3 use a data block B. It is preferable that the data block E differ from the data blocks A to D used in the forward1 phase.

In the announce phase, the GPUs 116, 116-1, 116-2, and 116-3 perform collective communication to share the deduction accuracies acquired by the GPUs 116, 116-1, 116-2, and 116-3 in the forward2 phase. As a communication result, the GPUs 116, 116-1, 116-2, and 116-3 acquire copies of all the deduction accuracies acquired by these GPUs. In the announce phase, for example, AllGather communication, which is one example of the collective communication, is used. However, AllReduce communication or broadcast communication, which is also one example of the collective communication, may alternatively be used. Next, the GPUs 116, 116-1, 116-2, and 116-3 determine the rank (best rank) that has calculated the highest deduction accuracy. The GPUs 116, 116-1, 116-2, and 116-3 obtain the same determination result.

In the revert_update phase, the GPUs 116, 116-1, 116-2, and 116-3 reflect the error gradients, which are the integration result obtained in the communicate phase, on the neural network weights which have been used before the update in the try_update phase in a parallel manner. The GPUs 116, 116-1, 116-2, and 116-3 use the same hyperparameter values relating to the learning rate. Specifically, each of the GPUs multiplies the hyperparameter basic values by the adjustment coefficients corresponding to the best rank determined in the announce phase. The GPUs 116, 116-1, 116-2, and 116-3 consequently hold a neural network having the weights common among these GPUs.

The GPUs 116, 116-1, 116-2, and 116-3 repeatedly perform the above seven phases while changing the data blocks. In the next forward1 phase, the CPU 116 uses a data block F, and the GPU 116-1 uses a data block G. The GPU 116-2 uses a data block H, and the CPU 116-3 uses a data block I. In the next forward2 phase, the GPUs 116, 116-1, 116-2, and 116-3 use a data block J.

FIG. 7 illustrates examples of a basic value table and an adjustment coefficient table.

The information processing apparatus 100 includes a basic value table 151 and an adjustment coefficient table 152.

In the basic value table 151, the basic values of the hyperparameters relating to the learning rate are registered. In the calculation examples to be described below, three hyperparameters "lr", "wd", and "momentum" are used in relation to the learning rate. Thus, in this basic value table 151, three basic values corresponding to these three hyperparameters are registered. The basic values in the basic value table 151 are given when machine learning is started and do not change during the machine learning.

In the adjustment coefficient table 152, ranks and adjustment coefficients are associated. A single adjustment coefficient is given to a single hyperparameter relating to the learning rate. In the calculation examples to be described below, the three hyperparameters "lr", "wd", and "momentum" are used in relation to the learning rate. Therefore, in the adjustment coefficient table 152, three adjustment coefficients, which are an adjustment coefficient c0 corresponding to "lr", an adjustment coefficient c1 corresponding to "wd", and an adjustment coefficient c2 corresponding to "momentum", are registered. In the adjustment coefficient table 152, a plurality of sets of adjustment coefficients are determined such that each of the ranks has a unique set of adjustment coefficients. This correspondence relationship between the ranks and the adjustment coefficients is given when machine learning is started and does not change during the machine learning.

The adjustment coefficient table 152 may be generated as follows, for example. First, an adjustment coefficient fluctuation range is determined per hyperparameter, and a coefficient space having a plurality of axes corresponding to the plurality of adjustment coefficients is defined. For example, a three-dimensional (3D) coefficient space corresponding to the adjustment coefficients of the three hyperparameters is defined. Next, based on the number of ranks, which is the number of GPUs used in the machine learning, a lattice width is determined, and lattice points are evenly set in the coefficient space. Next, different ranks are assigned to the plurality of lattice points in the coefficient space, and a set of adjustment coefficients (a set of three adjustment coefficients when a 3D coefficient space is used) indicated by a lattice point is associated with a rank. In this way, the plurality of GPUs are able to use hyperparameter values as far away from each other as possible.

While the adjustment coefficients registered in the adjustment coefficient table 152 in FIG. 7 are non-negative integers, the adjustment coefficients may be real numbers at 0.01 intervals, for example.

In addition, selection numbers are also recorded in association with the respective ranks in the adjustment coefficient table 152. These selection numbers may be recorded separately from the adjustment coefficient table 152. An individual selection number is the number of times the corresponding rank has been selected as the best rank during the repletion of the above seven phases. Since these best rank selection numbers are useful information for narrowing down the preferable values for the hyperparameters relating to the learning rate, the selection numbers are recorded and included in the result of the machine learning.

For example, when one or a few ranks have particularly large selection numbers as a result of the machine learning according to the second embodiment, a product of an adjustment coefficient corresponding to each of the one or a few ranks and the corresponding basic value is predicted to be a preferable value of a hyperparameter relating to the learning rate. Thus, in the subsequent machine learning, the hyperparameters relating to the learning rate are narrowed down to these preferable values. Therefore, the information processing apparatus 100 is able to focus on the search for the other hyperparameters.

For example, the basic value table 151 and the adjustment coefficient table 152 are created in advance and are copied and stored in the GPU memories 117, 117-1, 117-2, and 117-3. If the GPUs 116, 116-1, 116-2, and 116-3 beforehand agree on the generation method of the adjustment coefficient table 152, each of the GPUs 116, 116-1, 116-2, and 116-3 may generate the adjustment coefficient table 152. Instead of managing the correspondence relationship between the ranks and the adjustment coefficients in a table format, a function of calculating the adjustment coefficients from the ranks may be defined.

Next, calculation examples of updating the weights from the error gradients and the hyperparameters will be described.

FIG. 8 illustrates calculation examples in the try_update phase.

The following description assumes stochastic gradient descent (SGD).

The update of the weights of a neural network in the try_update phase may be written as a mathematical expression 51, for example. In the mathematical expression 51, $W(t)$ represents the weights at time t, $W(t-1)$ represents the weights at time $t-1$, and $\Delta W(t-1)$ are the error gradients calculated at time $t-1$. In addition, $V(t-1)$ represents an internal state at time $t-1$. The internal state $V(t-1)$ is a numerical value carried over such that the weights $W(t)$ reflect not only the previous error gradients $\Delta W(t-1)$ but also the error gradients before the previous error gradients with a delay. However, the internal state $V(t-1)$ is not updated in the try_update phase.

A basic value in the basic value table 151 is assigned to "lr" in the mathematical expression 51 and is multiplied by the adjustment coefficient c0. Another basic value in the basic value table 151 is assigned to "wd" in the mathematical expression 51 and is multiplied by the adjustment coefficient c1. The other basic value in the basic value table 151 is assigned to "momentum" in the mathematical expression 51 and is multiplied by the adjustment coefficient c2. The products, which are lr*c0, wd*c1, and momentum*c2, may be considered as adjusted hyperparameter values. In the mathematical expression 51, $W(t)$, $W(t-1)$, $\Delta W(t-1)$, and V(t−1) are vectors whose dimension corresponds to the number of weights included in the neural network. In the mathematical expression 51, lr, wd, momentum, c0, c1, and c2 are scalar values.

The update of the weights of the neural network in the try_update phase may be written as a pseudo program 52, for example. Each of the GPUs 116, 116-1, 116-2, and 116-3 executes a program such as the pseudo program 52.

Each GPU reads the adjustment coefficients c0, c1, and c2 corresponding to its own rank. The adjustment coefficients c0, c1, and c2 are read from the adjustment coefficient table 152, for example. Next, each GPU saves the current weights stored in an array "weight" in an array "temp_w". Next, each GPU multiplies the weights saved in the array "temp_w" by wd*c1 and adds the error gradients stored in an array "grad" to the product. Next, each GPU multiplies the resultant value by lr*c0 and assigns this product to an array "rescaled_grad". Next, each GPU multiplies the internal state stored in an array "state" by momentum*c2 and adds the value in the array "rescaled_grad" to the product, to obtain a subtraction value. Finally, each GPU subtracts the above subtraction value from the weights saved in the array "temp_w" and assigns the result to the array "weight". Herein, the internal state in the array "state" is not updated, and the pre-update weights remain saved in the array "temp_w".

In the array operation of the pseudo program 52, the operations of the different dimensions of array elements may be executed independently of each other. Namely, each of the GPUs 116, 116-1, 116-2, and 116-3 may start a plurality of threads by using a plurality of GPU cores and perform the operations of the different dimensions of array elements in a parallel manner by using the different threads.

In this respect, the update of the weights of the neural network in the try_update phase may be written as a pseudo program 53, for example. With this pseudo program 53, each GPU starts up to N threads (N is an integer of 2 or more) and performs the operations of the N-dimensional array elements in a parallel manner by using these threads.

Figure 9:
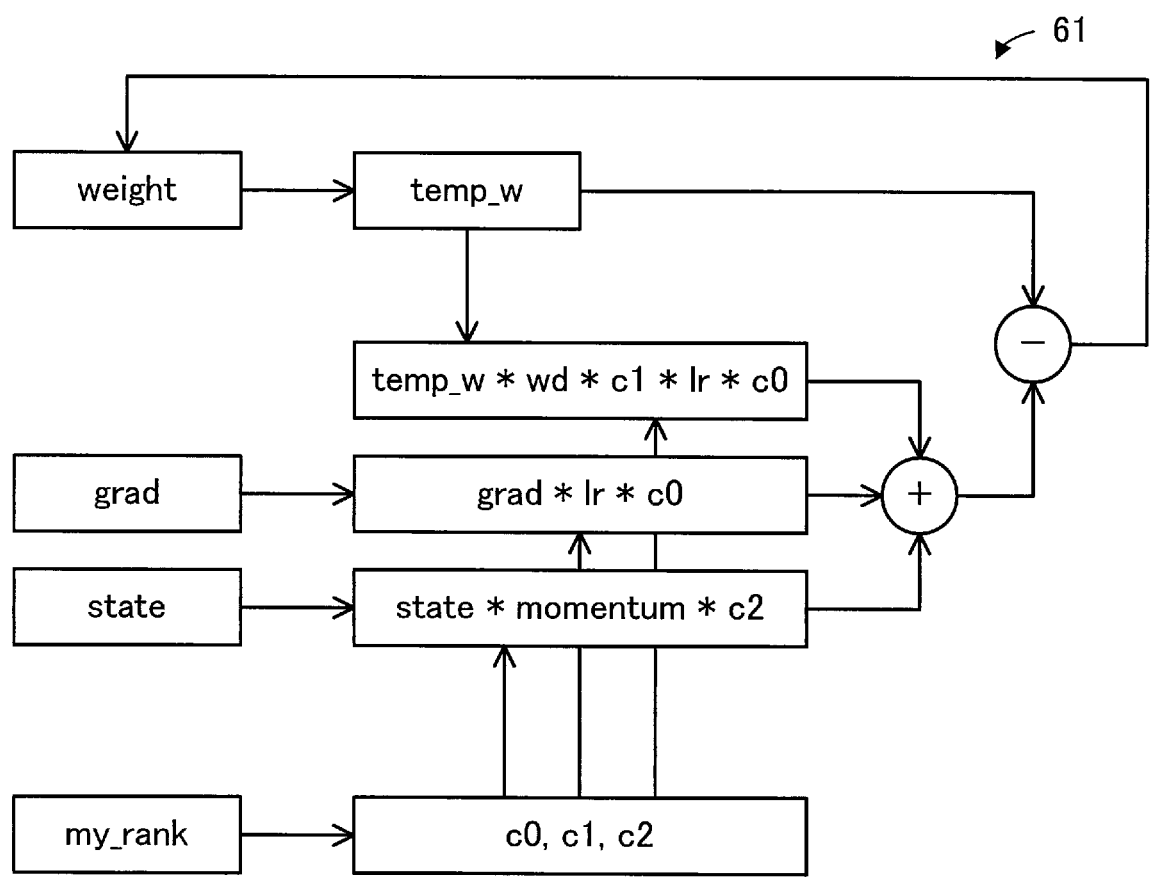
FIG. 9 illustrates a data flow example in the try_update phase.

FIG. 9 illustrates a data flow example in the try_update phase.

A data flow 61 illustrates a data relationship in the try_update phase. The weight "weight" is copied to the weight "temp_w", and the adjustment coefficients c0, c1, and c2 associated with a rank "my_rank" are read out. A product of the weight "temp_w", the hyperparameter basic values lr and wd, and the adjustment coefficients c0 and c1 is calculated. In addition, a product of the error gradient "grad", the hyperparameter basic value lr, and the adjustment coefficient c0 is calculated. In addition, a product of the internal state "state", the hyperparameter basic value "momentum", and the adjustment coefficient c2 is calculated. These three products are added up, and the sum is subtracted from the weight "temp_w". The weight "weight" is overwritten to be the subtraction result.

Figure 10:
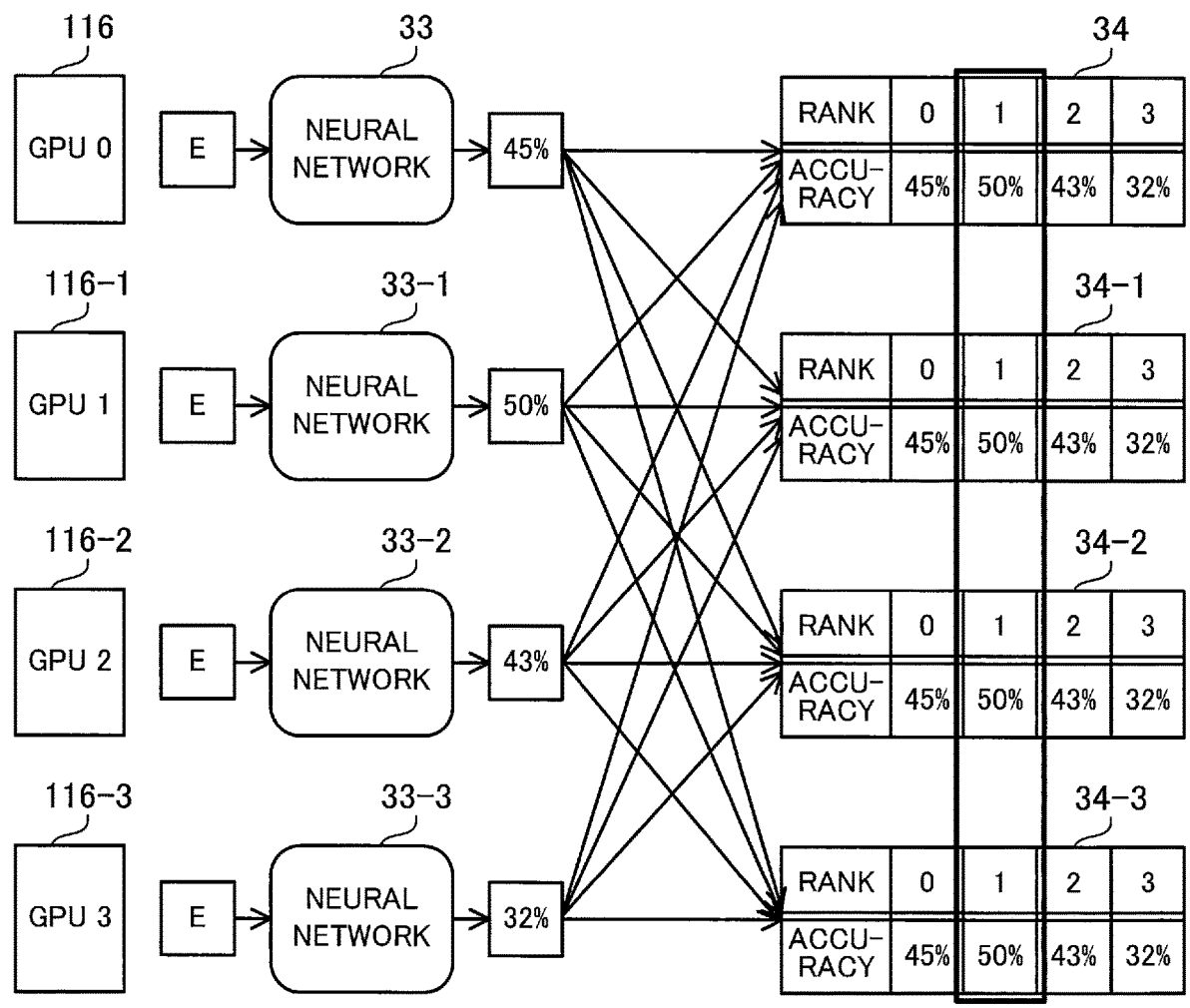
FIG. 10 illustrates examples in forward2 and announce phases.

FIG. 10 illustrates examples in the forward2 and announce phases.

As a result of the update of the weights in the try_update phase, the GPUs 116, 116-1, 116-2, and 116-3 hold neural networks 33, 33-1, 33-2, and 33-3, respectively.

In the forward2 phase, the GPU 116 assigns a data block E to the neural network 33. FIG. 10 assumes that the deduction accuracy of the neural network 33 is 45%. The GPU 116-1 assigns a data block E to the neural network 33-1. FIG. 10 assumes that the deduction accuracy of the neural network 33-1 is 50%. The GPU 116-2 assigns a data block B to the neural network 33-2. FIG. 10 assumes that the deduction accuracy of the neural network 33-2 is 43%. The GPU 116-3 assigns a data block E to the neural network 33-3. FIG. 10 assumes that the deduction accuracy of the neural network 33-3 is 32%.

In the announce phase, the GPUs 116, 116-1, 116-2, and 116-3 exchange their deduction accuracies with each other. As a result, the GPU 116 acquires a deduction accuracy set 34, and the GPU 116-1 acquires a deduction accuracy set 34-1. The GPU 116-2 acquires a deduction accuracy set 34-2, and the GPU 116-3 acquires a deduction accuracy set 34-3. These deduction accuracy sets 34, 34-1, 34-2, and 34-3 have the same contents and include all the deduction accuracies calculated by the GPUs 116, 116-1, 116-2, and 116-3.

The GPU 116 searches the deduction accuracy set 34 for a rank that has achieved the best deduction accuracy and determines that rank 1 that has achieved a deduction accuracy of 50% is the best rank. Likewise, based on the deduction accuracy set 34-1, the GPU 116-1 determines that rank 1 is the best rank. Based on the deduction accuracy set 34-2, the GPU 116-2 determines that rank 1 is the best rank. Based on the deduction accuracy set 34-3, the GPU 116-3 determines that rank 1 is the best rank. In this way, the GPUs 116, 116-1, 116-2, and 116-3 determine the same rank as the best rank.

FIG. 11 illustrates calculation examples in the revert_update phase.

The update of the weights of the neural network in the revert_update phase may be written as a mathematical expression 54, for example. The calculation method of the weights W(t) is basically the same as that in the try_update phase. However, in the revert_update phase, the internal state V(t) at time t is updated. The internal state V(t) is used as a subtraction value, and the weights W(t) are defined as the difference between the weights W(t−1) and the internal state V(t).

In addition, while each GPU uses the adjustment coefficients c0, c1, and c2 corresponding to its own rank in the try_update phase, each GPU uses adjustment coefficients b0, b1, and b2 corresponding to the best rank in the revert_update phase. The adjustment coefficient b0 corresponds to the adjustment coefficient c0 in the adjustment coefficient table 152. The adjustment coefficient b1 corresponds to the adjustment coefficient c1 in the adjustment coefficient table 152. The adjustment coefficient b2 corresponds to the adjustment coefficient c2 in the adjustment coefficient table 152. Regarding the hyperparameter "lr", a value obtained by multiplying the corresponding basic value by the adjustment coefficient b0 is used. Regarding the hyperparameter "wd", a value obtained by multiplying the corresponding basic value by the adjustment coefficient b1 is used. Regarding the hyperparameter "momentum", a value obtained by multiplying the corresponding basic value by the adjustment coefficient b2 is used.

The update of the weights of the neural network in the revert_update phase may be written as a pseudo program 55, for example. Each of the GPUs 116, 116-1, 116-2, and 116-3 executes a program such as the pseudo program 55.

Each GPU reads the adjustment coefficients b0, b1, and b2 corresponding to the best rank. The adjustment coefficients b0, b1, and b2 are read from the adjustment coefficient table 152, for example. Next, each GPU multiplies the weights saved to the array "temp_w" in the try_update phase by wd*b1 and adds the error gradients stored in the array "grad" to the product. Next, each GPU multiplies the sum by lr*b0 and assigns the result to the array "rescaled_grad". Next, each GPU multiplies the internal state stored in an array "state" by momentum*b2, adds the value in an array "rescaled_grad" to the product, and overwrites the internal state in the array "state" to be the result. Finally, each GPU subtracts the internal state in the array "state" from the weights stored in the array "temp_w" and assigns the result to the array "weight". The weights in the array "temp_w" may be discarded.

In the array operation of the pseudo program 55, the operations of the different dimensions of array elements may be performed independently of each other. In this respect, the update of the weights of the neural network in the revert_update phase may be written as a pseudo program 56, for example. With the pseudo program 56, each GPU starts up to N threads and performs the operations of the N-dimensional array elements in a parallel manner by using these threads.

Figure 12:
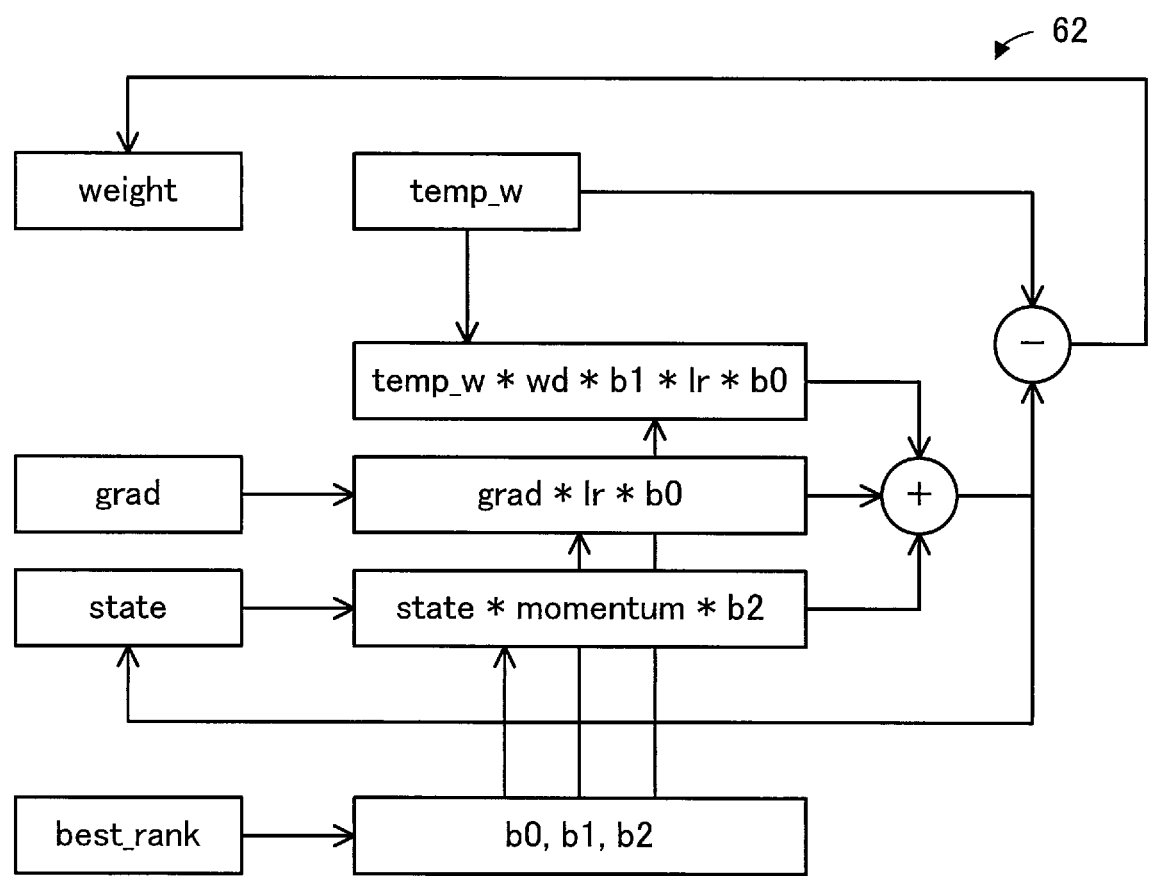
FIG. 12 illustrates a data flow example in the revert_update phase.

FIG. 12 illustrates a data flow example in the revert_update phase.

A data flow 62 illustrates a data relationship in the revert_update phase. The adjustment coefficients b0, b1, and b2 associated with a rank best_rank are read. A product of the weight "temp_w" saved in the try_update phase, the hyperparameter basic values lr and wd, and the adjustment coefficients b0 and b1 is calculated. In addition, a product of the error gradients "grad", the hyperparameter basic value lr, and the adjustment coefficient b0 is calculated. In addition, a product of the internal state "state", the hyperparameter basic value "momentum", and the adjustment coefficient b2 is calculated. These three products are added up, and the internal state "state" is overwritten to be the sum. In addition, the sum is subtracted from the weights "temp_w", and the weights "weight" is overwritten to be the subtraction result.

Next, functions and a processing procedure of the information processing apparatus 100 will be described.

Figure 13:
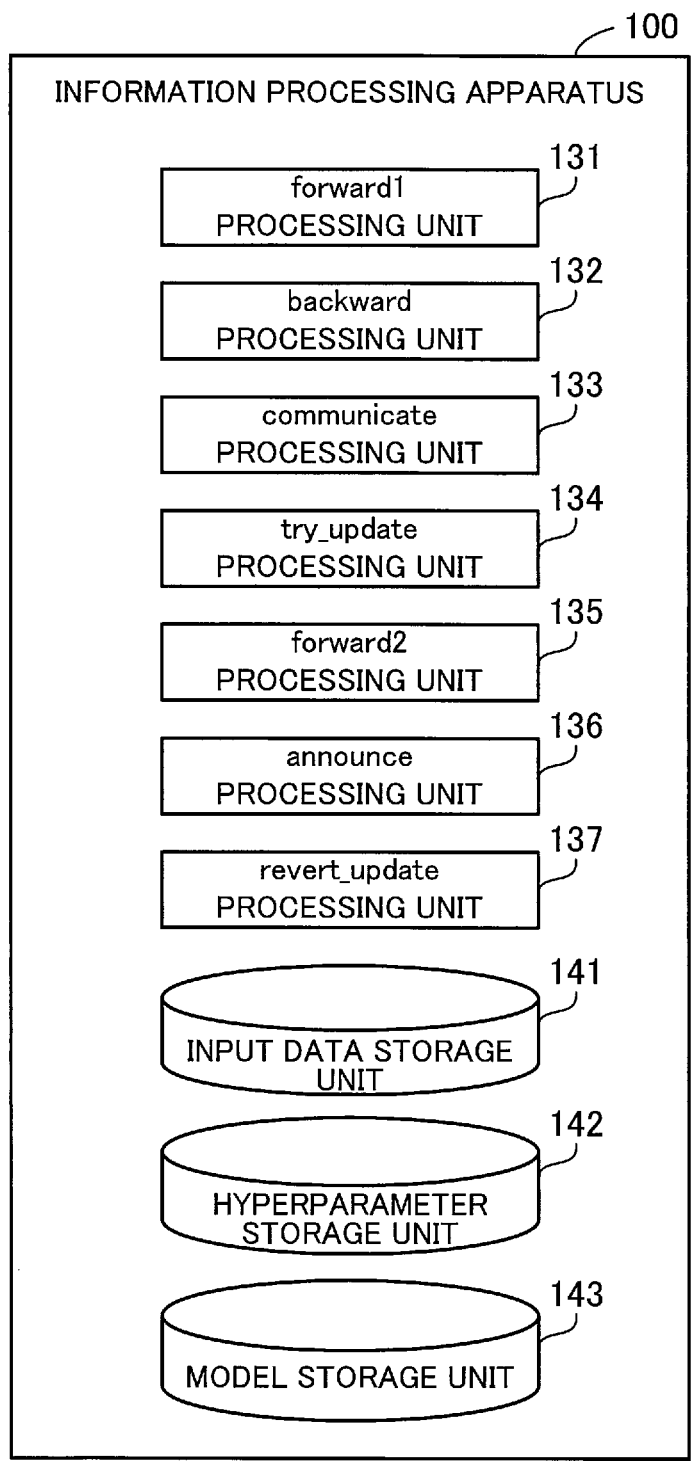
FIG. 13 is a block diagram illustrating a functional example of the information processing apparatus according to the second embodiment.

FIG. 13 is a block diagram illustrating a functional example of the information processing apparatus according to the second embodiment.

The information processing apparatus 100 includes a forward1 processing unit 131, a backward processing unit 132, a communicate processing unit 133, a try_update processing unit 134, a forward2 processing unit 135, an announce processing unit 136, and a revert_update processing unit 137. These processing units are implemented as programs executed by the GPUs 116, 116-1, 116-2, and 116-3, for example. In addition, the information processing apparatus 100 includes an input data storage unit 141, a hyperparameter storage unit 142, and a model storage unit 143. These storage units are implemented as storage areas of the GPU memories 117, 117-1, 117-2, and 117-3, for example.

Hereinafter, the above units corresponding to one of the GPUs will be described. The forward1 processing unit 131 executes the forward1 phase. The forward1 processing unit 131 extracts a single data block including a predetermined number of records from the data blocks that are stored in the input data storage unit 141 and that do not overlap among the CPUs. The forward1 processing unit 131 may randomly extract a data block. The forward1 processing unit 131 enters the extracted data block to a neural network stored in the model storage unit 143 and calculates a deduction accuracy corresponding to the data block.

The backward processing unit 132 executes the backward phase. The backward processing unit 132 performs backpropagation on the neural network stored in the model storage unit 143 by using the deduction accuracy calculated by the forward1 processing unit 131. Consequently, the backward processing unit 132 calculates the error gradients with respect to the respective weights included in the neural network. The error gradients are calculated sequentially, starting with the edges closest to the output layer of the neural network and ending with the edges closest to the input layer.

The communicate processing unit 133 executes the communicate phase. The communicate processing unit 133 integrates the error gradients calculated by the individual backward processing units 132 of the plurality of GPUs and calculates the integrated error gradients. Collective communication such as AllReduce communication is used as the inter-GPU communication used herein.

The try_update processing unit 134 executes the try_update phase. The try_update processing unit 134 copies and saves the plurality of weights included in the neural network stored in the model storage unit 143. In addition, the try_update processing unit 134 searches the hyperparameter storage unit 142 for the adjustment coefficients c0, c1, and c2 corresponding to its own rank. The try_update processing unit 134 updates the plurality of weights of the neural network, based on the integrated error gradients, the hyperparameter basic values stored in the hyperparameter storage unit 142, and the adjustment coefficients c0, c1, and c2.

The forward2 processing unit 135 executes the forward2 phase. The forward2 processing unit 135 extracts a single data block including a predetermined number of records from the data blocks that are stored in the input data storage unit 141 and that are common among the GPUs. The forward2 processing unit 135 may randomly extract a data block. The forward2 processing unit 135 enters the extracted data block to the updated neural network stored in the model storage unit 143 and calculates a deduction accuracy corresponding to the data block.

The announce processing unit 136 executes the announce phase. The announce processing unit 136 copies the deduction accuracies calculated by the forward2 processing units 135 of the plurality of GPUs and collects the deduction accuracies acquired by all the GPUs. Collective communication such as AllGather communication is used as the inter-GPU communication used herein. The announce processing unit 136 compares the collected deduction accuracies acquired by the plurality of GPUs with each other and determines the rank of the process that has transmitted the highest deduction accuracy to be the best rank.

The revert_update processing unit 137 executes the revert_update phase. The revert_update processing unit 137 searches the hyperparameter storage unit 142 for the adjustment coefficients b0, b1, and b2 corresponding to the best rank determined by the announce processing unit 136. In addition, the revert_update processing unit 137 reads the weights, which have been saved by the try_update processing unit 134. The revert_update processing unit 137 updates the plurality of weights included in the neural network, based on the integrated error gradients, the hyperparameter basic values stored in the hyperparameter storage unit 142, and the adjustment coefficients b0, b1, and b2.

The input data storage unit 141 holds a group of records usable as the input data in machine learning. The input data storage unit 141 may hold the records used in the forward1 phase separately from those used in the forward2 phase. Namely, the input data storage unit 141 may hold the data portions that do not overlap among the GPUs separately from those common among the GPUs.

There are two possible methods for transferring data to the GPU memories 117, 117-1, 117-2, and 117-3. In the first method, each CPU receives only the data used thereby. In the second method, each CPU also receives data that is not used thereby. In the first method, the CPU 111 or 111-1 divides an original dataset into two sections, one that does not overlap among the GPUs and the other that is common among the GPUs. Next, the former section is further divided into subsections, which are allocated to the respective GPUs. The common section is copied to al the GPUs. In the second method, the CPU 111 or 111-1 copies the same dataset to all the GPUs. In this case, each of the GPUs 116, 116-1, 116-2, and 116-3 selects a data block in accordance with a predetermined extraction algorithm so that different data blocks are used by the GPUs in the forward1 phase and that the same data block is used by the GPUs in the forward2 phase.

The hyperparameter storage unit 142 holds the above basic value table 151 and adjustment coefficient table 152. The model storage unit 143 holds the plurality of weights included in the neural network. From the try_update phase to the revert_update phase, the model storage unit 143 holds both the weights not updated and the weights updated.

The information processing apparatus 100 outputs a neural network obtained at the end of the machine learning, information about the deduction accuracy obtained by evaluating this neural network, and information about the selection number per rank recorded in the adjustment coefficient table 152, as a result of the machine learning. The result of the machine learning is read by, for example, the CPUs 111 and 111-1 from the GPU memories 117, 117-1, 117-2, and 117-3 and is stored in storage devices such as the HDDs 113 and 113-1. In addition, the result of the machine learning is displayed by the display device 121, for example. In addition, the result of the machine learning may be transmitted to another information processing apparatus.

Figure 14:
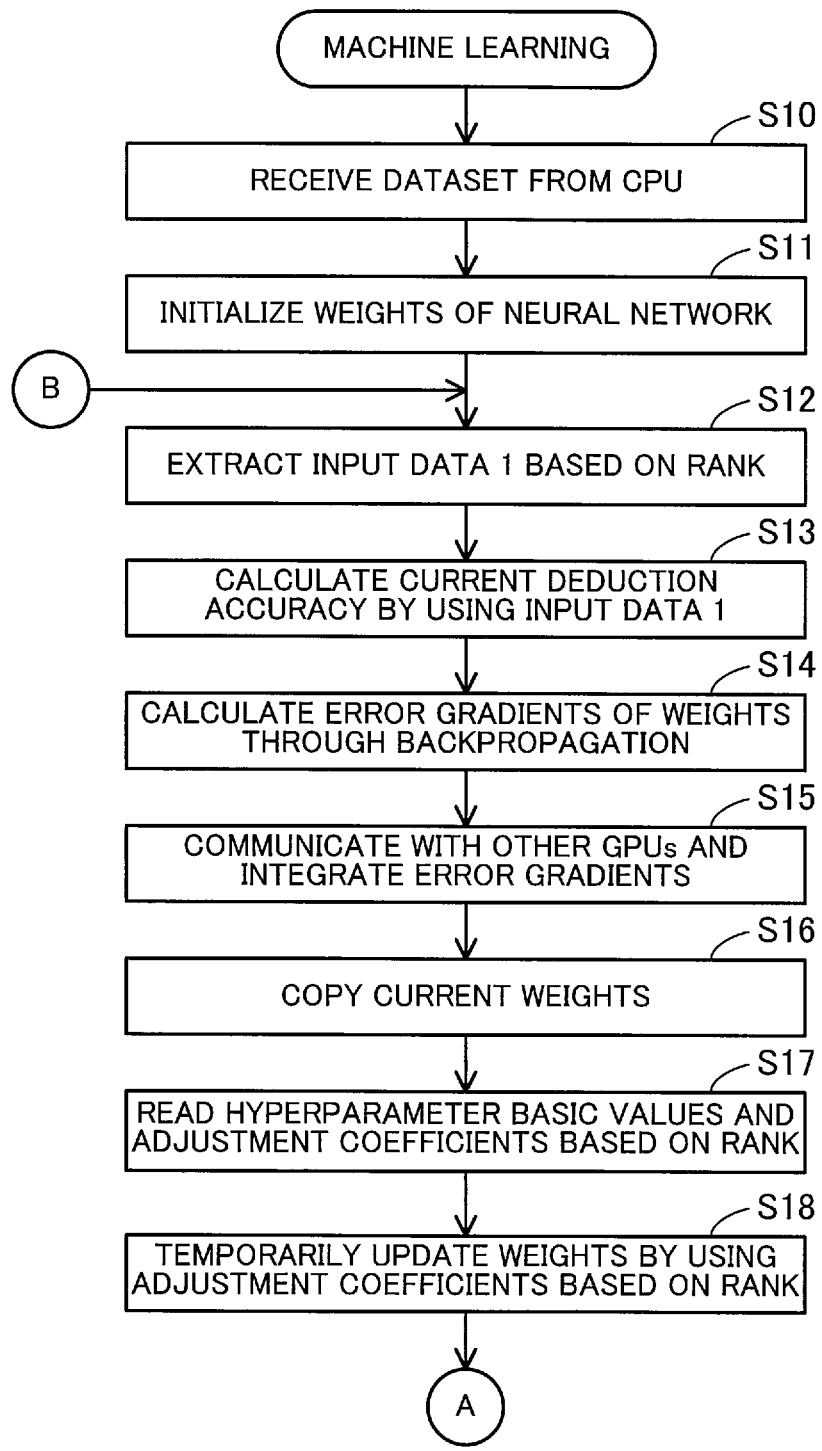
FIG. 14 is the first half of a flowchart illustrating a procedure example of the machine learning.

FIG. 14 is the first half of a flowchart illustrating a procedure example of the machine learning.

Hereinafter, this procedure of the machine learning will be described with a focus on the GPU 116.

(S10) The GPU 116 receives a dataset from the CPU 111.

(S11) The GPU 116 initializes the weights of a neural network. The initial values of the weights of the neural network are the same as those of the other GPUs.

(S12) The GPU 116 determines a rank (its own rank) of a process executed by the GPU 116 and extracts input data 1 matching its own rank from the dataset.

(S13) The GPU 116 enters feature amounts included in the input data 1 to the neural network, compares the deduction results outputted by the neural network with the corresponding training labels included in the input data 1, and calculates the current deduction accuracy with respect to the input data 1. Steps S12 and S13 correspond to the forward1 phase.

(S14) The GPU 116 calculates error gradients with respect to the weights of the neural network through backpropagation based on the deduction accuracy calculated in step S13. Step S14 corresponds to the backward phase.

(S15) The GPU 116 communicates with the other GPUs and integrates all the error gradients of the GPUs acquired in the backward phase. If MPI AllReduce communication is used, the error gradients may be integrated in the process of the communication. If MPI broadcast communication or AllGather communication is used, the GPU 116 first collects all the error gradients acquired by the GPUs and next integrates these error gradients explicitly. Step S15 corresponds to the communicate phase.

(S16) The GPU 116 copies and saves the current weights of the neural network. The saved weights are held until the following step S24.

(S17) The GPU 116 reads the hyperparameter basic values from the basic value table 151 and the adjustment coefficients matching its own rank from the adjustment coefficient table 152.

(S18) By using the hyperparameter basic values and the adjustment coefficients read in step S17, the GPU 116 reflects the error gradients integrated in step S15 on the weights of the neural network and temporarily updates the weights of the neural network. Steps S16 to S18 correspond to the try_update phase.

Figure 15:
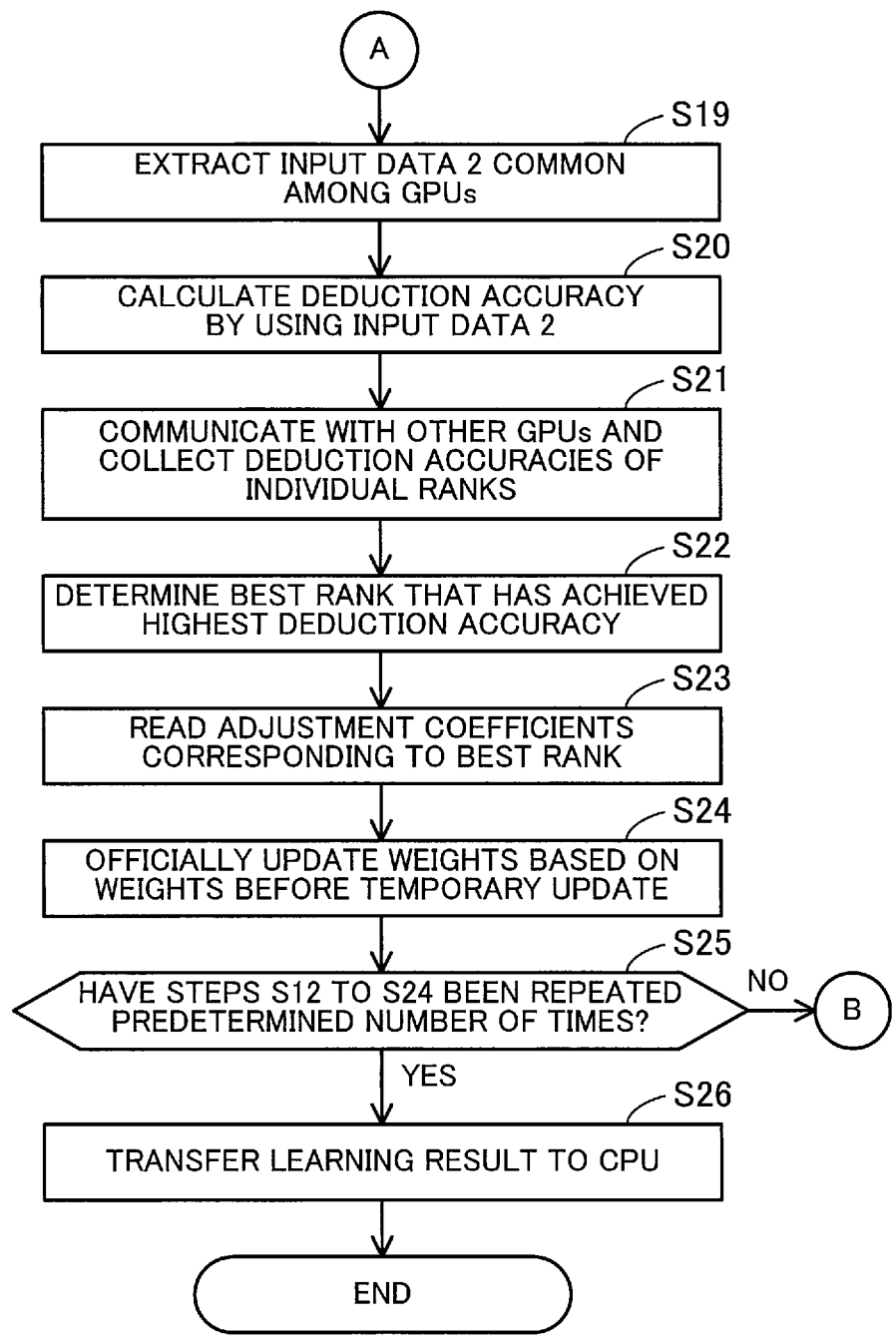
FIG. 15 is the second half of the flowchart illustrating the procedure example of the machine learning.

FIG. 15 is the second half of the flowchart that illustrating the procedure example of the machine learning.

(S19) The GPU 116 extracts common input data 2 from the dataset.

(S20) The GPU 116 enters feature amounts included in the input data 2 to the neural network, compares the deduction results outputted by the neural network with the corresponding training labels included in the input data 2, and calculates the current deduction accuracy with respect to the input data 2. Steps S19 and S20 correspond to the forward2 phase.

(S21) The GPU 116 communicates with the other GPUs and collects the deduction accuracies of all the GPUs acquired in the forward2 phase. In this step, MPI AllGather communication, broadcast communication, or AllReduce communication may be used, for example.

(S22) The GPU 116 determines the highest deduction accuracy among the deduction accuracies collected in step S21 and determines the rank of the process that has transmitted the highest deduction accuracy to be the best rank. Steps S21 and S22 correspond to the announce phase.

(S23) The GPU 116 reads the hyperparameter basic values from the basic value table 151 and the adjustment coefficients corresponding to the best rank from the adjustment coefficient table 152.

(S24) By using the hyperparameter basic values and adjustment coefficients read in step S23, the GPU 116 reflects the error gradients integrated in step S15 on the weights of the neural network and officially updates the weights of the neural network. This update in this step is performed based on the weights before the temporary update which have been saved in step S16. Steps S23 and S24 correspond to the revert_update phase.

(S25) The GPU 116 determines whether steps S12 to S24 have been repeated a predetermined number of times. This predetermined number is given by the user as a hyperparameter, for example. If steps S12 to S24 have been repeated the predetermined number of times, the processing proceeds to step 626. Otherwise, the processing returns to step S12.

(S26) The GPU 116 ends the machine learning. The GPU 116 transfers the result of the machine learning to the CPU 111 in response to a request from the CPU 111. For example, the result of the machine learning includes the final weights of the neural network, information about the deduction accuracy of the neural network, and information about the selection number per rank.

Figure 16:
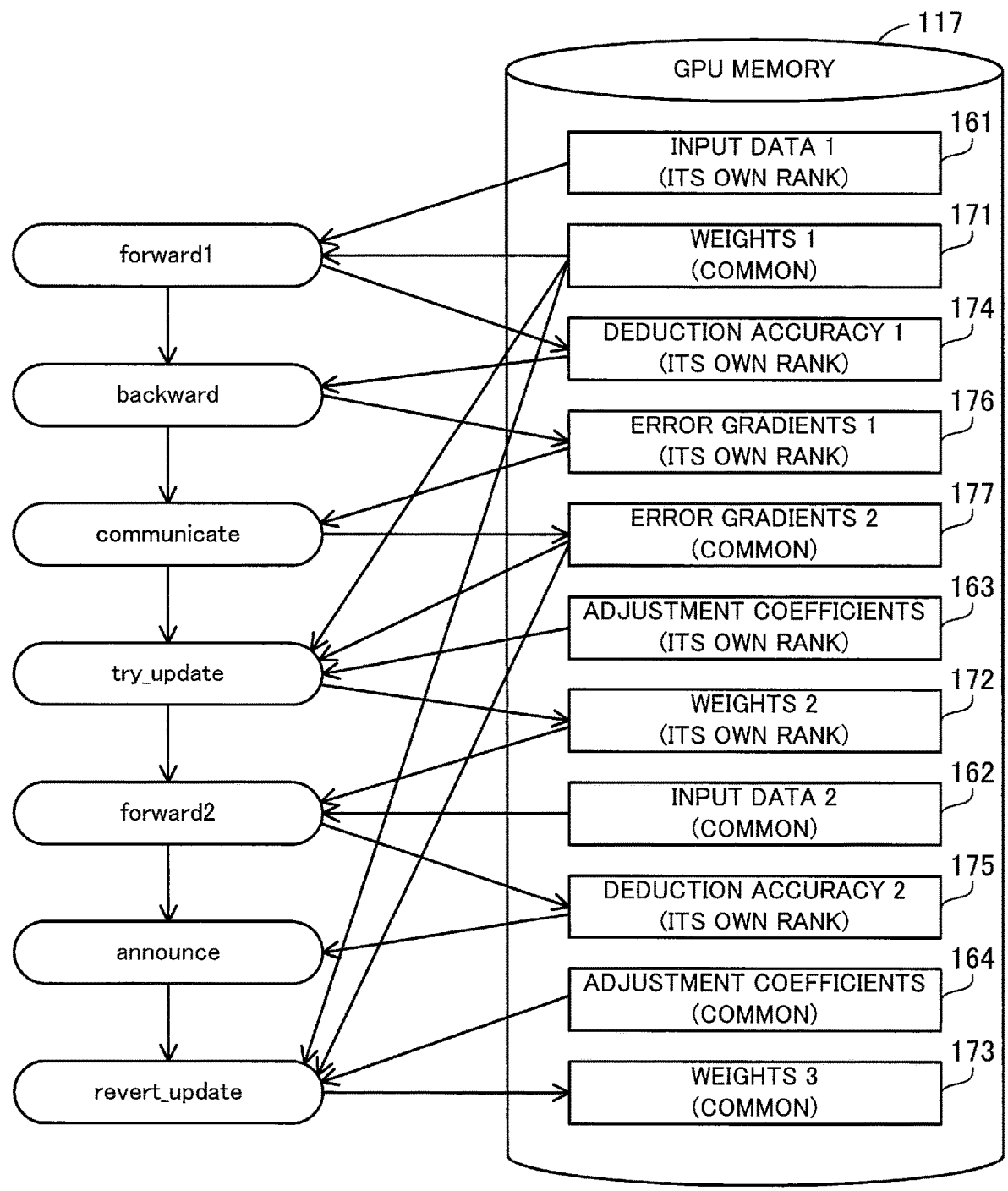
FIG. 16 illustrates a data input-output example of the machine learning.

FIG. 16 illustrates a data input-output example of the machine learning.

This data input-output example is an example of how the GPU memory 117 is used.

In the forward1 phase, the GPU 116 reads input data 161 (input data 1) of its own rank and common weights 171 (weights 1) from the GPU memory 117 and writes a deduction accuracy 174 (deduction accuracy 1) of its own rank in the GPU memory 117. In the backward phase, the GPU 116 reads the deduction accuracy 174 from the GPU memory 117 and writes error gradients 176 (error gradients 1) of its own rank in the GPU memory 117.

In the communicate phase, the GPU 116 reads the error gradients 176 from the GPU memory 117 and writes common error gradients 177 (error gradients 2) in the GPU memory 117. The error gradients 177 are obtained by integrating the error gradients acquired by the plurality of GPUs. In the try_update phase, the GPU 116 reads the weights 171, the error gradients 177, and adjustment coefficients 163 of its own rank from the GPU memory 117 and writes weights 172 (weights 2) of its own rank in the GPU memory 117.

In the forward2 phase, the GPU 116 reads the weights 172 and common input data 162 (input data 2) from the GPU memory 117 and writes deduction accuracy 175 (deduction accuracy 2) of its own rank in the GPU memory 117. In the announce phase, the GPU 116 reads the deduction accuracy 175 from the GPU memory 117. In the revert_update phase, the CPU 116 reads the weights 171, the error gradients 177, and common adjustment coefficients 164 and writes common weights 173 (weights 3) in the GPU memory 117. The adjustment coefficients 164 are those corresponding to the best rank.

Next, a variation of the machine learning according to the second embodiment will be described.

Figure 17:
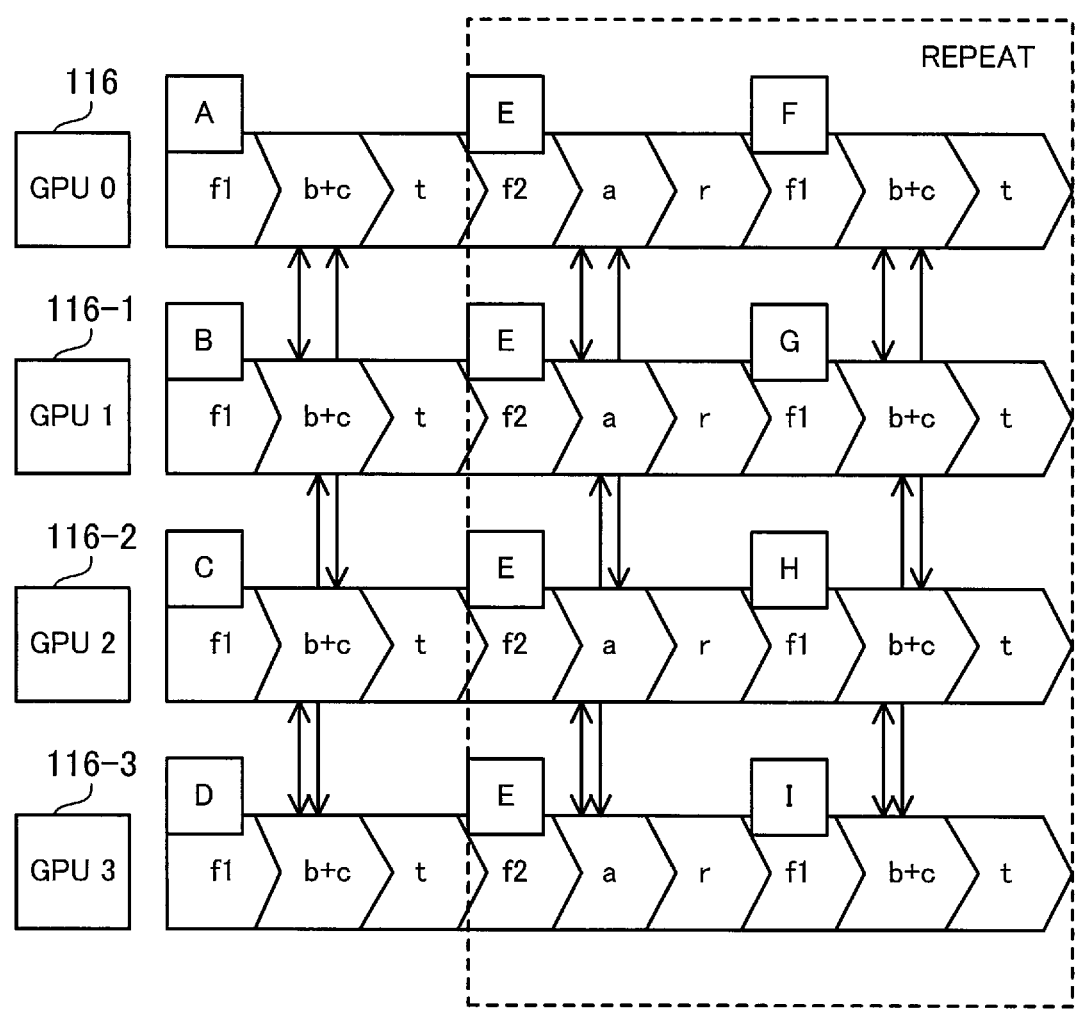
FIG. 17 illustrates another phase example in the machine learning.

FIG. 17 illustrates another phase example in the machine learning.

In the above description of FIG. 6, the GPUs 116, 116-1, 116-2, and 116-3 execute the seven phases sequentially. In particular, the GPUs 116, 116-1, 116-2, and 116-3 execute the backward phase and start the communicate phase after completion of the backward phase.

However, the backward phase and the communicate phase may be fused with each other. In the backward phase, the error gradients of the edges are determined in one direction from the output layer to the input layer of the neural network. When the error gradients of edges close to the input layer are being calculated, the error gradients of edges close to the output layer have already been determined. These determined error gradients may be shared among the GPUs at an early point. In addition, the calculation of the error gradients and the communication among the GPUs may be performed independently of each other.

Therefore, by fusing the backward phase and the communicate phase with each other, the calculation of the error gradients per GPU and the integration of the error gradients among the GPUs are performed in a parallel manner. Namely, each of the GPUs 116, 116-1, 116-2, and 116-3 calculates the error gradients starting with those close to the output layer, and when the individual GPU finishes calculating the error gradients of a certain layer, the GPU transmits the calculated error gradients of this layer to the other GPUs while calculating the error gradients of the previous layer. This corresponds to dividing the original error gradient vector and transmitting the resultant vectors to the other GPUs. In this way, the backward phase and the communicate phase are fused, and the learning time is shortened.

The information processing apparatus 100 according to the second embodiment calculates different error gradients with respect to different data blocks in a parallel manner by using a plurality of GPUs and integrates the error gradients acquired by the plurality of GPUs. Thus, the information processing apparatus 100 learns the weights of the neural network more quickly than other information processing apparatuses that calculate the error gradients of a plurality of data blocks sequentially.

In addition, when the integrated error gradients are reflected on the weights of the neural network, the GPUs use different values as the hyperparameters relating to the learning rate and temporarily update the weights to those different among the GPUs. The deduction accuracies with respect to a common data block are evaluated based on the temporarily updated weights, and the best hyperparameter values are estimated. Next, based on the estimated best hyperparameter values, the weights are officially updated by the plurality of GPUs.

In this way, the search for the hyperparameters relating to the learning rate is also performed in a single machine learning operation. Thus, the search for the hyperparameters is performed more efficiently, and the number of times the individual GPU repeats machine learning while changing various hyperparameter values is reduced. As a result, a total learning time until the search for the hyperparameter converges is shortened. In addition, the deduction accuracy of the neural network is improved efficiently.

In addition, since the hyperparameter values are changed in a pseudo manner among the plurality of GPUs, a correspondence relationship between the ranks and the adjustment coefficients is defined in advance. By multiplying the adjustment coefficients based on the corresponding rank by the respective basic values that are not changed during machine learning, the hyperparameter values fluctuate from their basic values depending on the GPU. In this way, the hyperparameter values used by the plurality of GPUs are adjusted efficiently.

In addition, in the try_update phase, the original weights that have not yet been updated are saved, and in the revert_update phase, the weights are updated again, based on the original weights and the adjustment coefficients corresponding to the best rank. In this way, the official update of the weights is performed efficiently.

For example, as a method in which the original weights are not saved, there is a method in which the weights of the GPU that has achieved the highest deduction accuracy are broadcast to the other GPUs to be used to overwrite the weights of the individual GPUs. However, since a neural network generally includes many weights, broadcasting the weight vector results in heavy communication load. In contrast, according to the second embodiment, the GPUs only need to transmit their respective deduction accuracies. Thus, since the GPUs do not need to transmit their respective weight vectors, the communication load is less. There is also a method in which difference information for modifying the weights of the individual GPUs retroactively is transmitted. However, since the weights are numerical values having a large digit number after the decimal point, there is a risk that the modification results do not match among the CPUs due to the number of significant digits. In contrast, according to the second embodiment, since the plurality of GPUs recalculate the weights from the same numerical values in the same procedure, the weights are integrated even in distributed processing.

In one aspect, search for hyperparameters is performed in machine learning more efficiently.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a plurality of processors; and
a plurality of memories corresponding to the plurality of processors,
wherein each of the plurality of processors is configured to execute a process including:
entering, to a model which represents a neural network and which includes a first weight common among the plurality of processors, first data different from first data used by other processors, calculating an error gradient with respect to the first weight based on an output of the model, and integrating the error gradient and other error gradients calculated by the other processors to obtain an integrated error gradient,
storing the first weight in a corresponding memory among the plurality of memories and updating a weight of the model to a second weight based on a hyperparameter value different from hyperparameter values used by the other processors, the integrated error gradient, and the first weight,
entering second data common among the plurality of processors to the model, evaluating accuracy of an output of the model, comparing an evaluation result of the accuracy with evaluation results acquired by the other processors, and selecting a hyperparameter value common among the plurality of processors, and
updating the weight of the model to a third weight based on the selected hyperparameter value, the integrated error gradient, and the first weight stored in the corresponding memory.

2. The information processing apparatus according to claim 1, wherein, among a plurality of hyperparameter values corresponding to the plurality of processors, a hyperparameter value corresponding to a processor that has achieved a highest output accuracy is selected as the hyperparameter value common among the plurality of processors.

3. The information processing apparatus according to claim 1, wherein the hyperparameter value different from the hyperparameter values used by the other processors is generated by applying an adjustment coefficient different from adjustment coefficients used by the other processors to a hyperparameter basic value common among the plurality of processors.

4. The information processing apparatus according to claim 1, wherein
identification information is assigned to a process executed by each of the plurality of processors,
the hyperparameter value different from the hyperparameter values used by the other processors is determined from identification information assigned to a corresponding process, and
one item of identification information common among the plurality of processors is selected based on the comparing of the evaluation result of the accuracy with the evaluation results acquired by the other processors, and the hyperparameter value common among the plurality of processors is determined from the selected one item of identification information.

5. The information processing apparatus according to claim 1, wherein
the model includes a plurality of first weights, and calculation of error gradients with respect to first weights for which error gradients have not been calculated among the plurality of first weights and transfer of error gradients that have been calculated among the plurality of processors are performed in a parallel manner.

6. An information processing method comprising:
entering, by each of a plurality of processors of a computer, to a model which represents a neural network and which includes a first weight common among the plurality of processors, first data different from first data used by other processors, calculating an error gradient with respect to the first weight based on an output of the model, and integrating the error gradients calculated by the plurality of processors to obtain an integrated error gradient,
storing, by each of the plurality of processors, the first weight in a corresponding memory and updating a weight of the model to a second weight based on a hyperparameter value different from hyperparameter values used by the other processors, the integrated error gradient, and the first weight,
entering, by each of the plurality of processors, second data common among the plurality of processors to the model, evaluating accuracy of an output of the model, comparing results of the evaluating performed by the plurality of processors, and selecting a hyperparameter value common among the plurality of processors, and
updating, by each of the plurality of processors, the weight of the model to a third weight based on the selected hyperparameter value, the integrated error gradient, and the first weight stored in the corresponding memory.

7. A non-transitory computer-readable recording medium storing therein a computer program that causes a computer including a plurality of processors to execute a process comprising:
causing each of the plurality of processors to enter, to a model which represents a neural network and which includes a first weight common among the plurality of processors, first data different from first data used by other processors, calculate an error gradient with respect to the first weight based on an output of the model, and integrate the error gradients calculated by the plurality of processors to obtain an integrated error gradient,
causing each of the plurality of processors to store the first weight in a corresponding memory and update a weight of the model to a second weight based on a hyperparameter value different from hyperparameter values used by the other processors, the integrated error gradient, and the first weight,
causing each of the plurality of processors to enter second data common among the plurality of processors to the model, evaluate accuracy of an output of the model, compare results of the evaluations performed by the plurality of processors, and select a hyperparameter value common among the plurality of processors, and
causing each of the plurality of processors to update the weight of the model to a third weight based on the selected hyperparameter value, the integrated error gradient, and the first weight stored in the corresponding memory.

* * * * *